United States Patent
Kubota

(10) Patent No.: US 10,312,553 B2
(45) Date of Patent: Jun. 4, 2019

(54) CONTROL DEVICE, BALANCE CORRECTION DEVICE, ELECTRIC STORAGE SYSTEM AND APPARATUS

(71) Applicant: NExT-e Solutions Inc., Tokyo (JP)

(72) Inventor: Haruhiko Kubota, Kanagawa (JP)

(73) Assignee: NExT-e Solutions Inc., Tokyo (JP)

( * ) Notice: Subject to any disclaimer, the term of this patent is extended or adjusted under 35 U.S.C. 154(b) by 0 days.

(21) Appl. No.: 15/836,938

(22) Filed: Dec. 11, 2017

(65) Prior Publication Data
US 2018/0233787 A1    Aug. 16, 2018

(30) Foreign Application Priority Data
Feb. 13, 2017    (JP) .................. 2017-024480

(51) Int. Cl.
| | |
|---|---|
| H02J 7/00 | (2006.01) |
| H01M 10/44 | (2006.01) |
| H01M 10/42 | (2006.01) |
| H01M 10/46 | (2006.01) |
| H01M 10/052 | (2010.01) |

(Continued)

(52) U.S. Cl.
CPC ......... *H01M 10/44* (2013.01); *H01M 10/052* (2013.01); *H01M 10/425* (2013.01); *H01M 10/441* (2013.01); *H01M 10/46* (2013.01); *H01M 10/482* (2013.01); *H02J 7/0016* (2013.01); *H02J 7/0021* (2013.01);

(Continued)

(58) Field of Classification Search
CPC ...... H02J 7/0016; H02J 7/0018; H02J 7/0021; H02J 1/12; H02J 7/0019; H02J 7/0042; H02J 7/0045; H02J 7/0014; Y02T 10/7055; H01M 10/441; H01M 10/44; H01M 10/46; H01M 10/425; H01M 2010/4271; Y02E 60/12
USPC ................................................. 320/118, 107
See application file for complete search history.

(56) References Cited

U.S. PATENT DOCUMENTS

| | | |
|---|---|---|
| 2013/0057198 A1 | 3/2013 | Gerlovin |
| 2014/0009116 A1* | 1/2014 | Nakao ................. H01M 10/425 |
| | | 320/116 |

(Continued)

FOREIGN PATENT DOCUMENTS

| | | |
|---|---|---|
| JP | 2006067742 A | 3/2006 |
| JP | 2008017605 A | 1/2008 |
| JP | 2009232660 A | 10/2009 |

OTHER PUBLICATIONS

Rohm, Inductor Calculation for Buck Converter IC, Nov. 2012, Rohm Co., Ltd, Rev C. pp. 4.*

*Primary Examiner* — Richard Isla
*Assistant Examiner* — Mohammed J Sharief

(57) ABSTRACT

A control device for controlling a balance correction device which equalizes voltages of a first electric storage cell and a second electric storage cell connected in series includes: a current information acquiring unit which acquires information about a current value of current flowing in an inductor; and a control signal supplying unit which supplies the balance correction device with a control signal for controlling the balance correction device, such that a valley in an absolute value of the current value satisfies a predetermined condition, based on information about the current value acquired by the current information acquiring unit, during at least part of a period of time in which the balance correction device operates.

17 Claims, 14 Drawing Sheets

(51) Int. Cl.
*H01M 10/48* (2006.01)
*H02J 1/12* (2006.01)
*H01M 4/58* (2010.01)

(52) U.S. Cl.
CPC .. *H01M 4/5825* (2013.01); *H01M 2010/4271* (2013.01); *H02J 1/12* (2013.01); *H02J 7/0019* (2013.01)

(56) References Cited

U.S. PATENT DOCUMENTS

| | | |
|---|---|---|
| 2014/0145669 A1 | 5/2014 | Wortham |
| 2015/0002083 A1* | 1/2015 | Nakao ................ H01M 10/44 320/107 |
| 2015/0296576 A1* | 10/2015 | Kang ................ H05B 33/0815 315/240 |
| 2015/0326041 A1 | 11/2015 | Hamada et al. |
| 2015/0357842 A1 | 12/2015 | Bailly et al. |

* cited by examiner

CONTROL DEVICE, BALANCE CORRECTION DEVICE, ELECTRIC STORAGE SYSTEM AND APPARATUS

The contents of the following Japanese patent application are incorporated herein by reference:
NO. 2017-024480 filed on Feb. 13, 2017.

BACKGROUND

1. Technical Field

The present invention relates to a control device, a balance correction device, an electric storage system and an apparatus.

2. Related Art

In use of a number of electric storage cells connected in series, variation in the voltages of electric storage cells may result in an inefficient use of the capacity of the electric storage cells and decrease in the available amount of electricity. As such, it has been proposed to equalize the voltages of electric storage cells using a balance correction circuit (see patent documents 1-3).

Patent Document 1: Japanese Patent Application Publication No. 2006-067742
Patent Document 2: Japanese Patent Application Publication No. 2008-017605
Patent Document 3: Japanese Patent Application Publication No. 2009-232660

For example, when equalizing the voltages of electric storage cells using an inductor and a switching element which increases or decreases current flowing in the inductor (which may be referred to as inductor current), the inductor current may significantly increase or decrease during an operating period of the balance correction circuit due to the voltages of the electric storage cells, the specifications of components constituting the balance correction circuit or the like.

SUMMARY

A first aspect of the present invention provides a control device. For example, the control device controls a balance correction device which equalizes voltages of a first electric storage cell and a second electric storage cell connected in series. The balance correction device may include an inductor having one end electrically connected to a connection point between one end of the first electric storage cell and one end of the second electric storage cell. The balance correction device may include a first switching element electrically connected between another end of the inductor and another end of the first electric storage cell. The balance correction device may include at least one of (i) a second switching element and (ii) a rectifier, electrically connected between the other end of the inductor and the other end of the second electric storage cell. For example, the rectifier passes current flowing in a direction from a negative pole side of the second electric storage cell toward a positive pole side of the second electric storage cell and does not pass current flowing in a direction from the positive pole side of the second electric storage cell toward the negative pole side of the second electric storage cell. The control device may include a current information acquiring unit which acquires information about a current value of current flowing in the inductor. The control device may include a control signal supplying unit which supplies the balance correction device with a control signal for controlling the balance correction device, such that a valley in an absolute value of the current value satisfies a predetermined condition, based on information about the current value acquired by the current information acquiring unit, during at least part of a period of time in which the balance correction device operates.

The control signal supplying unit may supply the control signal such that (i) a value of the valley is equal to a predetermined first value, (ii) a value of the valley is greater than the first value, or (iii) a value of the valley is within a predetermined range including the first value. The control signal supplying unit may supply the control signal such that (i) a value of the valley is equal to a first value determined based on a value of a voltage or SOC of at least one of the first electric storage cell and the second electric storage cell, (ii) a value of the valley is greater than the first value, or (iii) a value of the valley is within a range including the first value, the range determined based on a value of a voltage or SOC of at least one of the first electric storage cell and the second electric storage cell.

For example, (a) if the balance correction device includes at least the second switching element, the control signal supplying unit supplies the first switching element and the second switching element with the control signal for controlling the first switching element and the second switching element to be turned on and off such that, while the balance correction device operates, the balance correction device repeatedly performs a switching operation including (i) a first operation in which the first switching element is turned on and the second switching element is turned off and (ii) a second operation in which the first switching element is turned off and the second switching element is turned on. For example, (b) if the balance correction device includes the second switching element and the rectifier arranged in parallel, the control signal supplying unit supplies the first switching element and the second switching element with the control signal for controlling the first switching element and the second switching element to be turned on and off such that, while the balance correction device operates, the balance correction device repeatedly performs a switching operation including (i) a first operation in which the first switching element is turned on and the second switching element is turned off, and at least one of (ii) a second operation in which the first switching element is turned off and the second switching element is turned on and (iii) a third operation in which the first switching element is turned off and the second switching element is turned off. For example, (c) if the balance correction device includes at least the rectifier, the control signal supplying unit supplies the first switching element with the control signal for controlling the first switching element to be turned on and off such that, while the balance correction device operates, the balance correction device repeatedly performs a switching operation including (i) a first operation in which the first switching element is turned on and (ii) a second operation in which the first switching element is turned off.

The control signal supplying unit may include a first timing determining unit which determines a timing to supply a first control signal for turning on the first switching element. The control signal supplying unit may include a second timing determining unit which determines a timing to supply a second control signal for turning off the first switching element. The control signal supplying unit may include a control signal generating unit which generates the first control signal at the timing determined by the first timing determining unit and generates the second control signal at the timing determined by the second timing determining unit. For example, (a) if the balance correction device includes at least the second switching element, the first control signal may be a signal for turning on the first switching element and turning off the second switching element, and the second control signal may be a signal for turning off the first switching element and turning on the second switching element. For example, (b) if the balance correction device includes the second switching element and the rectifier arranged in parallel, the first control signal may be a signal for turning on the first switching element and turning off the second switching element, and the second control signal may be (i) a signal for turning off the first switching element and turning on the second switching element or (ii) a signal for turning off the first switching element and turning off the second switching element. For example, (c) if the balance correction device includes at least the rectifier, the first control signal may be a signal for turning on the first switching element, and the second control signal may be a signal for turning off the first switching element.

According to the control device, when charges are to be transferred from the first electric storage cell to the second electric storage cell, the first timing determining unit may determine to supply the first control signal at a predetermined periodic time. According to the control device, when charges are to be transferred from the first electric storage cell to the second electric storage cell, the second timing determining unit may determine to supply the second control signal at a timing when the absolute value of the current value exceeds a reference value determined based on (i) the first value and (ii) an estimated value of a decrease rate of the absolute value of the current value in the second operation. According to the control device, the second timing determining unit may determine, when a first reference voltage having a predetermined first voltage waveform and a detection voltage for detecting the current coincide, to supply the second control signal. According to the control device, the reference voltage may include a triangular wave, sawtooth wave or trapezoidal wave having a gradient according to the estimated value of the decrease rate of the absolute value of the current value. According to the control device, the second timing determining unit may determine, when the absolute value of the current value does not exceed the reference value within a predetermined first period, to supply the second control signal at a timing when the first period has elapsed.

According to the control device, the balance correction device may include the second switching element. According to the control device, when charges are to be transferred from the second electric storage cell to the first electric storage cell, the first timing determining unit may determine to supply the first control signal at a timing when the absolute value of the current value exceeds a reference value determined based on (i) the first value and (ii) an estimated value of a decrease rate of the absolute value of the current value in the first operation. According to the control device, when charges are to be transferred from the second electric storage cell to the first electric storage cell, the second timing determining unit may determine to supply the second control signal at a predetermined periodic time. According to the control device, the first timing determining unit may determine, when a second reference voltage having a predetermined second voltage waveform and a detection voltage for detecting the current coincide, to supply the first control signal. According to the control device, the reference voltage may include a triangular wave, sawtooth wave or trapezoidal wave having a gradient according to the estimated value of the decrease rate of the detection voltage. According to the control device, the first timing determining unit may determine, when the absolute value of the current value does not exceed the reference value within a predetermined second period, to supply the first control signal at a timing when the second period has elapsed.

The control device may include a current detecting unit which detects the current. The control device may include a direction determining unit which determines a direction to transfer charges. The control device may include an operation determining unit which determines at least one of whether or not to operate the balance correction device and whether or not to stop the balance correction device. The control device may include a charge transfer amount estimating unit which estimates an amount of charges transferred between the first electric storage cell and the second electric storage cell based on (i) an operating time of the balance correction device, and (ii) at least one of information about the current value acquired by the current information acquiring unit and the predetermined condition about a valley in the absolute value of the current value. According to the control device, at least one of the first electric storage cell and the second electric storage cell may include a lithium-ion battery including a lithium compound containing an iron component as a positive electrode material.

A second aspect of the present invention provides a balance correction device. For example, the balance correction device equalizes voltages of a first electric storage cell and a second electric storage cell connected in series. The balance correction device may include an inductor having one end electrically connected to a connection point between one end of the first electric storage cell and one end of the second electric storage cell. The balance correction device may include a first switching element electrically connected between another end of the inductor and another end of the first electric storage cell. The balance correction device may include at least one of (i) a second switching element and (ii) a rectifier, electrically connected between the other end of the inductor and the other end of the second electric storage cell. The balance correction device may include the control device. According to the balance correction device, for example, the rectifier passes current flowing in a direction from a negative pole side of the second electric storage cell toward a positive pole side of the second electric storage cell and does not pass current flowing in a direction from the positive pole side of the second electric storage cell toward the negative pole side of the second electric storage cell.

A third aspect of the present invention provides an electric storage system. The electric storage system may include a first electric storage cell and a second electric storage cell connected in series. The electric storage system may include the balance correction device.

A fourth aspect of the present invention provides an apparatus. The apparatus may include the electric storage system. The apparatus may include at least one of (i) a load which consumes electric power supplied from the electric storage system and (ii) charging equipment for supplying electric power from the electric storage system to other equipment.

The summary clause does not necessarily describe all necessary features of the embodiments of the present invention. The present invention may also be a sub-combination of the features described above.

DESCRIPTION OF EXEMPLARY EMBODIMENTS

Figure 1:
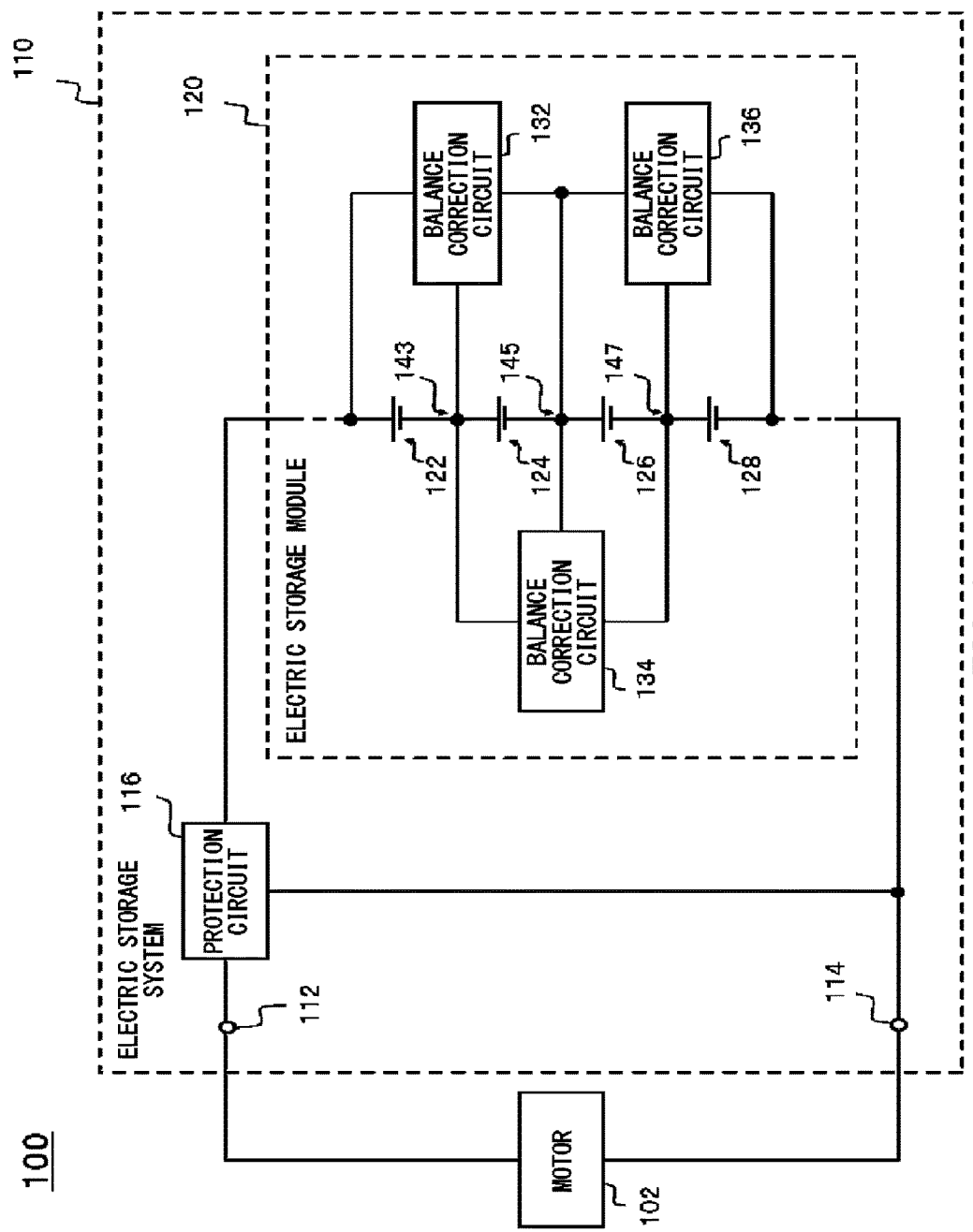
FIG. 1 schematically shows an example of an apparatus 100 including an electric storage system 110.

Hereinafter, some embodiments of the present invention will be described. The embodiments do not limit the invention according to the claims, and all the combinations of the features described in the embodiments are not necessarily essential to means provided by aspects of the invention. Also, the embodiments will be described with reference to the drawings, and the same or like parts illustrated in the drawings may be marked with the same reference numerals to omit overlapping descriptions.

FIG. 1 schematically shows an example of an apparatus 100 including an electric storage system 110. The configuration and operation of the apparatus 100 and the electric storage system 110 will be described using FIG. 1. In this embodiment, the apparatus 100 includes a motor 102 and the electric storage system 110. The motor 102 is electrically connected to the electric storage system 110 and consumes electric power supplied from the electric storage system 110. The motor 102 may be used as a regenerative brake. The motor 102 may be an example of a load.

In an embodiment, the electric storage system 110 is electrically connected to the motor 102, and supplies the motor 102 with electric power (which may be referred to as discharging of the electric storage system). In another embodiment, the electric storage system 110 is electrically connected to a charging device (not shown), and stores electrical energy supplied from the charging device (which may be referred to as charging of the electric storage system).

Note that the apparatus 100 is not limited by this embodiment. The apparatus 100 includes, for example, at least one of (i) a load which consumes electric power supplied from the electric storage system 110 and (ii) charging equipment for supplying electric power from the electric storage system 110 to other equipment. The apparatus 100 may be a transport apparatus such as an electric car, hybrid car, electric motorcycle, railway car or elevator, or the apparatus 100 may be electrical equipment such as a PC or mobile phone, or the apparatus 100 may be a charging device.

As shown in FIG. 1, in this embodiment, the electric storage system 110 includes a terminal 112, a terminal 114, a protection circuit 116 and an electric storage module 120. The electric storage module 120 may include a plurality of electric storage cells connected in series including an electric storage cell 122, an electric storage cell 124, an electric storage cell 126 and an electric storage cell 128, and a plurality of balance correction circuits including a balance correction circuit 132, a balance correction circuit 134 and a balance correction circuit 136. The balance correction circuit 132, the balance correction circuit 134 and the balance correction circuit 136 may be an example of a balance correction device.

Here, the phrase "electrically connected" does not necessarily mean that an element and another element are directly connected. A third element may intervene between an element and another element. Also, the phrase "electrically connected" does not necessarily mean that an element and another element are physically connected. For example, input windings and output windings in a transformer are not physically connected, but they are electrically connected. Further, the phrase "electrically connected" does not only mean that an element and another element are electrically connected in actuality, but also means that an element and another element are electrically connected when an electric storage cell and a balance correction circuit are electrically connected.

Note that the phrase "connected in series" means that an element and another element are electrically connected in series. Also, unless specifically stated otherwise, the "voltage difference" between electric storage cells refers to a value obtained by, when the voltages (which may be referred to as inter-terminal voltages) of two electric storage cells are compared, subtracting the voltage of the electric storage cell having a lower voltage from the voltage of the electric storage cell having a higher voltage.

The terminal 112 and the terminal 114 electrically connect the electric storage system 110 and equipment or devices external to the system, such as the motor 102 and a charging device. The protection circuit 116 protects the electric storage module 120 from experiencing at least one of overcurrent, overvoltage and overdischarge. For example, a known overcurrent/overvoltage protection circuit such as disclosed in Japanese Patent Application Publication No. 2009-183141 can be used as the protection circuit 116.

In this embodiment, the electric storage cell 122, the electric storage cell 124, the electric storage cell 126 and the electric storage cell 128 are connected in series. The electric storage cell 122, the electric storage cell 124, the electric storage cell 126 and the electric storage cell 128 may be secondary batteries or capacitors. Examples of the type of the secondary batteries can include lithium batteries, lithium-ion batteries, lithium-sulfur batteries, sodium-sulfur batteries, lead-acid batteries, nickel-hydrogen batteries, nickel-cadmium batteries, redox flow batteries, metal-air batteries and the like. The type of the lithium-ion batteries is not particularly limited. Examples of the type of the lithium-ion batteries can include iron phosphate-based, manganese-based, cobalt-based, nickel-based and ternary batteries and the like.

At least one of the electric storage cell 122, the electric storage cell 124, the electric storage cell 126 and the electric storage cell 128 may further include a plurality of electric storage cells. At least one of the electric storage cell 122, the electric storage cell 124, the electric storage cell 126 and the electric storage cell 128 may include a plurality of electric storage cells connected in series. At least one of the electric storage cell 122, the electric storage cell 124, the electric storage cell 126 and the electric storage cell 128 may include a plurality of electric storage cells connected in parallel. At least one of the electric storage cell 122, the electric storage cell 124, the electric storage cell 126 and the electric storage cell 128 may include a plurality of electric storage cells connected in a matrix manner.

This embodiment describes a case where the electric storage module 120 includes a plurality of electric storage cells connected in series. However, the electric storage module 120 is not limited by this embodiment. In another embodiment, the electric storage module 120 may include a plurality of electric storage cells connected in parallel.

In this embodiment, the balance correction circuit 132 equalizes the voltages of the electric storage cell 122 and the electric storage cell 124. The balance correction circuit 132 is electrically connected to one end of the electric storage cell 122 that is closer to the terminal 112 (which may be referred to as the positive pole side of the electric storage cell 122). The balance correction circuit 132 is electrically connected to a connection point 143 between one end of the electric storage cell 122 that is closer to the terminal 114 (which may be referred to as the negative pole side of the electric storage cell 122) and the positive pole side of the electric storage cell 124. The balance correction circuit 132 is electrically connected to a connection point 145 between the negative pole side of the electric storage cell 124 and the positive pole side of the electric storage cell 126.

In an embodiment, the balance correction circuit 132 may include an inductor (not shown) which is electrically connected to the connection point 143. By electrically connecting the balance correction circuit 132 to the electric storage cell 122 and the electric storage cell 124 in the above-described manner, a first circuit including the electric storage cell 122 and the above-described inductor and a second circuit including the electric storage cell 124 and the above-described inductor are formed. The balance correction circuit 132 passes current through the first circuit and the second circuit alternately. In this manner, electrical energy can be transferred between the electric storage cell 122 and the electric storage cell 124 via the inductor. As a result, the voltages of the electric storage cell 122 and the electric storage cell 124 can be equalized.

This embodiment has described a case where the balance correction circuit 132 equalizes the voltages of two adjacent electric storage cells. However, the balance correction circuit 132 is not limited by this embodiment. In another embodiment, the balance correction circuit 132 may equalize the voltages of any two electric storage cells selected from three or more electric storage cells connected in series. For example, by electrically connecting the balance correction circuit 132 to the connection point 145 instead of the connection point 143 and to a connection point 147 instead of the connection point 145, the voltages of the electric storage cell 122 and the electric storage cell 126 can be equalized using the balance correction circuit 132.

In this embodiment, the balance correction circuit 134 equalizes the voltages of the electric storage cell 124 and the electric storage cell 126. The balance correction circuit 134 is electrically connected to the connection point 143, the connection point 145 and a connection point 147 between the negative pole side of the electric storage cell 126 and the positive pole side of the electric storage cell 128. The balance correction circuit 136 equalizes the voltages of the electric storage cell 126 and the electric storage cell 128. The balance correction circuit 136 is electrically connected to the connection point 145, the connection point 147 and the negative pole side of the electric storage cell 128. The balance correction circuit 134 and the balance correction circuit 136 may have similar configurations to the balance correction circuit 132.

As described above, according to the electric storage module 120 in this embodiment, even if variation in the voltages of a plurality of electric storage cells occurs, the balance correction circuit can operate to equalize the voltages of the plurality of electric storage cells. As a result, the usage efficiency of the electric storage system 110 can be improved.

For example, if the electric storage cell 122 and the electric storage cell 124 are different in manufacturing quality, deterioration degree or the like, differences may occur in battery characteristics of the electric storage cell 122 and the electric storage cell 124. Examples of the battery characteristics can include battery capacity and discharge/voltage characteristic indicating the relation between battery voltage and discharging time. For example, as deterioration of an electric storage cell advances, the battery voltage lowers in a shorter discharging time.

In the case where the electric storage cell 122 and the electric storage cell 124 are different in battery characteristics, even if the voltages of the electric storage cell 122 and the electric storage cell 124 are substantially the same at the completion of charging of the electric storage system 110, variation in the voltages of the electric storage cell 122 and the electric storage cell 124 occurs as discharging of the electric storage system 110 advances. Also, even if the voltages of the electric storage cell 122 and the electric storage cell 124 are substantially the same at the beginning of charging of the electric storage system 110, variation in the voltages of the electric storage cell 122 and the electric storage cell 124 occurs as charging of the electric storage system 110 advances.

If the electric storage cell 122 and the electric storage cell 124 are used, an available range of charging level (which may be referred to as State of Charge, SOC) may be predetermined. In such a case, when variation in the voltages of the electric storage cell 122 and the electric storage cell 124 occurs, the usage efficiency of the electric storage system 110 is worsened. However, the usage efficiency of the electric storage system 110 can be improved by equalizing the voltages of the electric storage cell 122 and the electric storage cell 124.

Details of the electric storage system will be described using FIG. 2. In FIG. 1, descriptions have been made for a case where the electric storage module 120 in the electric storage system 110 includes three or more electric storage cells and two or more balance correction circuits. On the other hand, in FIG. 2, for purposes of simplifying descriptions of the electric storage system, details of the electric storage system will be described using an example where the electric storage system includes two electric storage cells and one balance correction circuit. However, those skilled in the art who contacted the details of the embodiment described in relation to FIG. 2 can also appreciate the configuration and operation of an electric storage system including three or more electric storage cells and two or more balance correction circuits.

Figure 2:
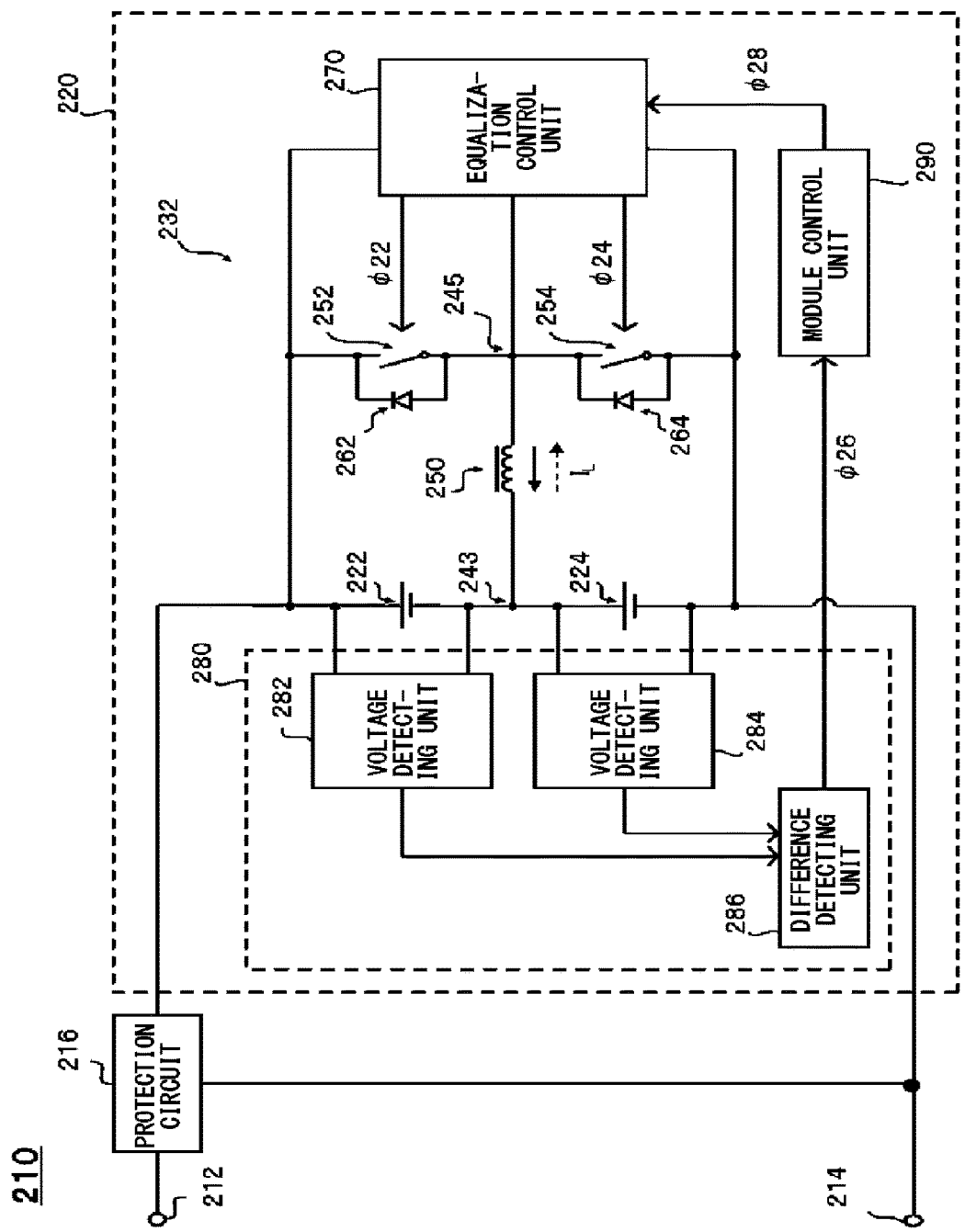
FIG. 2 schematically shows an example of an electric storage system 210.

FIG. 2 schematically shows an example of an electric storage system 210. In this embodiment, the electric storage system 210 includes a terminal 212, a terminal 214, a protection circuit 216 and an electric storage module 220. In this embodiment, the electric storage module 220 includes an electric storage cell 222 and an electric storage cell 224 connected in series, and a balance correction circuit 232 which equalizes the voltages of the electric storage cell 222 and the electric storage cell 224.

In this embodiment, the balance correction circuit 232 includes an inductor 250, a switching element 252, a switching element 254 and an equalization control unit 270. The balance correction circuit 232 may include a diode 262 and a diode 264. At least one of the diode 262 and the diode 264 may be a parasitic diode which is equivalently formed between the source and drain of a MOSFET or the like. The balance correction circuit 232 may include a voltage monitoring unit 280. The voltage monitoring unit 280 includes, for example, a voltage detecting unit 282, a voltage detecting unit 284 and a difference detecting unit 286. The balance correction circuit 232 may include a module control unit 290.

The equalization control unit 270, and the switching element 252 and the switching element 254 may be formed on the same substrate, or may be formed on different substrates. The equalization control unit 270 and the module control unit 290 may be formed on the same substrate, or may be formed on different substrates.

This embodiment describes a case where the balance correction circuit 232 includes the equalization control unit 270 and the module control unit 290. However, the balance correction circuit 232 is not limited by this embodiment. In another embodiment, the equalization control unit 270 may have at least part of the function of the module control unit 290, or the module control unit 290 may have at least part of the function of the equalization control unit 270.

This embodiment describes a case where (i) a resistor provided at an appropriate position in a first circuit including the electric storage cell 222, the inductor 250, and the switching element 252 or the diode 262, and (ii) a resistor provided at an appropriate position in a second circuit including the electric storage cell 224, the inductor 250, and the switching element 254 or the diode 264 are used as a current detecting unit for detecting inductor current flowing in the inductor 250. The above-described resistors may be shunt resistors. However, the current detecting unit is not limited by this embodiment.

In another embodiment, the internal resistance of the switching element 252 and the internal resistance of the switching element 254 may be used as the current detecting unit. In yet another embodiment, the current detecting unit may be an ammeter which detects current flowing in the inductor 250 and transmits a signal including information indicating the current value of the inductor 250 to the equalization control unit 270.

One of the electric storage cell 222 and the electric storage cell 224 may be an example of a first electric storage cell. The other of the electric storage cell 222 and the electric storage cell 224 may be an example of a second electric storage cell. The balance correction circuit 232 may be an example of a balance correction device. One of the switching element 252 and the switching element 254 may be an example of a first switching element. The other of the switching element 252 and the switching element 254 may be an example of a second switching element. One of the diode 262 and the diode 264 may be an example of a rectifying unit or a second rectifying unit. The other of the diode 262 and the diode 264 may be an example of a first rectifying unit. The equalization control unit 270 may be an example of a control device. The module control unit 290 may be an example of a direction determining unit, an operation determining unit or a charge transfer amount estimating unit.

In descriptions of each unit in the electric storage system 210, descriptions of similar configurations to each unit in the electric storage system 110 may be omitted. For example, the terminal 212 and the terminal 214 may have a similar configuration to the terminal 112 and the terminal 114, respectively. The protection circuit 216 may have a similar configuration to the protection circuit 116. The electric storage module 220 may have a similar configuration to the electric storage module 120. Each of the electric storage cell 222 and the electric storage cell 224 may have a similar configuration to the electric storage cell 122, the electric storage cell 124, the electric storage cell 126 or the electric storage cell 128. Also, at least part of the electric storage system 110 described in relation to FIG. 1 may have a similar configuration to its corresponding member of the electric storage system 210.

In this embodiment, the balance correction circuit 232 is electrically connected to the positive pole side of the electric storage cell 222, a connection point 243 between the negative pole side of the electric storage cell 222 and the positive pole side of the electric storage cell 224, and the negative pole side of the electric storage cell 224. In this manner, a first open/close circuit including the electric storage cell 222, the switching element 252 and the inductor 250 is formed. A second open/close circuit including the electric storage cell 224, the inductor 250 and the switching element 254 is also formed. The connection point 243 may be an example of a connection point between one end of the first electric storage cell and one end of the second electric storage cell.

In this embodiment, the inductor 250 is connected between the electric storage cell 222 and the switching element 252 and connected in series to the electric storage cell 222 and the switching element 252, and adjusts the voltage of at least one of the electric storage cell 222 and the electric storage cell 224. In this embodiment, one end of the inductor 250 is electrically connected to the connection point 243. The other end of the inductor 250 is electrically connected to a connection point 245 between the switching element 252 and the switching element 254.

In this embodiment, the switching element 252 and the switching element 254 are alternately and repeatedly turned on and off, and thereby an inductor current $I_L$ is generated in the inductor 250. In this manner, electrical energy can be transferred between the electric storage cell 222 and the electric storage cell 224 via the inductor 250. As a result, the voltages of the electric storage cell 222 and the electric storage cell 224 can be equalized.

In this embodiment, the switching element 252 is electrically connected between the other end of the inductor 250 and the positive pole side of the electric storage cell 222. The switching element 252 receives a drive signal φ22 from the equalization control unit 270, and is turned on or off based on the drive signal φ22. In this manner, the first open/close circuit is opened and closed. The switching element 252 may be a MOSFET.

In this embodiment, the switching element 254 is electrically connected between the other end of the inductor 250 and the negative pole side of the electric storage cell 224. The switching element 254 receives a drive signal φ24 from the equalization control unit 270, and is turned on or off based on the drive signal φ24. In this manner, the second open/close circuit is opened and closed. The switching element 254 may be a MOSFET.

In this embodiment, the diode 262 is electrically connected between the other end of the inductor 250 and the positive pole side of the electric storage cell 222. The diode 262 is arranged in parallel with the switching element 252. The diode 262 passes current in a direction from the other end of the inductor 250 toward the positive pole side of the electric storage cell 222. On the other hand, the diode 262 does not pass current in a direction from the positive pole side of the electric storage cell 222 toward the other end of the inductor 250. That is, the diode 262 passes current flowing in a direction from the negative pole side of the electric storage cell 222 toward the positive pole side of the electric storage cell 222, and does not pass current flowing in a direction from the positive pole side of the electric storage cell 222 toward the negative pole side of the electric storage cell 222.

In this embodiment, the diode 264 is electrically connected between the other end of the inductor 250 and the negative pole side of the electric storage cell 224. The diode 264 is arranged in parallel with the switching element 254. The diode 264 passes current in a direction from the negative pole side of the electric storage cell 224 toward the other end of the inductor 250. On the other hand, the diode 264 does not pass current in a direction from the other end of the inductor 250 toward the negative pole side of the electric storage cell 224. That is, the diode 264 passes current flowing in a direction from the negative pole side of the electric storage cell 224 toward the positive pole side of the electric storage cell 224, and does not pass current flowing in a direction from the positive pole side of the electric storage cell 224 toward the negative pole side of the electric storage cell 224.

By providing the diode 262 and the diode 264, even if the inductor current $I_L$ remains during a period of time in which both the switching element 252 and the switching element 254 are turned off, the inductor current $I_L$ can continue to flow through the diode 262 or the diode 264. In this manner, the inductor current $I_L$ once generated in the inductor 250 can be fully used. It is also possible to suppress generation of a surge voltage when the inductor current $I_L$ is shut down.

In this embodiment, the equalization control unit 270 controls the balance correction circuit 232 by controlling at least one of the switching element 252 and the switching element 254. For example, the equalization control unit 270 controls at least one of the switching element 252 and the switching element 254 based on an operation control signal φ28 from the module control unit 290.

In this embodiment, the equalization control unit 270 supplies the switching element 252 with the drive signal φ22 for controlling the switching element 252 to be turned on and off. Also, the equalization control unit 270 supplies the switching element 254 with the drive signal φ24 for controlling the switching element 254 to be turned on and off.

In an embodiment, the equalization control unit 270 supplies the drive signal φ22 and the drive signal φ24 such that the switching element 252 and the switching element 254 are alternately (or complementarily) and repeatedly turned on and off. In this manner, while the balance correction circuit 232 operates, a switching operation is repeatedly performed such that a state in which current flows in the first open/close circuit and a state in which current flows in the second open/close circuit are alternately shifted.

In another embodiment, the equalization control unit 270 supplies the drive signal φ22 and the drive signal φ24 such that one of the switching element 252 and the switching element 254 is repeatedly turned on and off and the other of the switching element 252 and the switching element 254 stays turned off. In this manner, while the balance correction circuit 232 operates, a switching operation is repeatedly performed such that a state in which current flows in the first open/close circuit and a state in which current flows in the second open/close circuit are alternately shifted.

For example, if the operation control signal φ28 indicates to transfer charges from the electric storage cell 222 to the electric storage cell 224, the equalization control unit 270 supplies the drive signal φ22 and the drive signal φ24 such that the switching element 252 is repeatedly turned on and off and the switching element 254 stays turned off. In this case, the inductor current flows in the second open/close circuit via the diode 264. On the other hand, if the operation control signal φ28 indicates to transfer charges from the electric storage cell 224 to the electric storage cell 222, the equalization control unit 270 supplies the drive signal φ22 and the drive signal φ24 such that the switching element 254 is repeatedly turned on and off and the switching element 252 stays turned off. In this case, the inductor current flows in the first open/close circuit via the diode 262.

The equalization control unit 270 may generate various control signals used to control the balance correction circuit 232 by combinations of the drive signal φ22 and the drive signal φ24. In an embodiment, the equalization control unit 270 generates a first control signal for turning on the switching element 252 and turning off the switching element 254. In another embodiment, the equalization control unit 270 generates a second control signal for turning off the switching element 252 and turning on the switching element 254. In yet another embodiment, the equalization control unit 270 generates a third control signal for turning off the switching element 252 and turning off the switching element 254. Each of the first control signal, the second control signal and the third control signal may be configured by the drive signal φ22 and the drive signal φ24.

In this embodiment, the equalization control unit 270 controls the balance correction circuit 232 such that, while the balance correction circuit 232 operates, the balance correction circuit 232 repeatedly performs the following switching operation. Also, the equalization control unit 270 controls the balance correction circuit 232 such that, while the balance correction circuit 232 stops, the balance correction circuit 232 stops the switching operation.

For example, the equalization control unit 270 supplies the switching element 252 and the switching element 254 with the drive signal φ22 and the drive signal φ24 such that, during an operating period of the balance correction circuit 232, the balance correction circuit 232 repeatedly performs the switching operation at a predetermined periodic time. Here, the "predetermined periodic time" does not only mean that a periodic time for repeating the switching operation is preset, but also means that the periodic time is varied by any predetermined control or analog circuit.

For example, even if any information in the present cycle and a predetermined particular algorithm or particular analog circuit determine a periodic time for the subsequent cycle, the periodic time may be an example of the "predetermined periodic time". Also, even if a particular algorithm or particular analog circuit determines a timing to switch at least one of a first operation, a second operation and a third operation included in the switching operation to another operation, the periodic time of the switching operation may be an example of the "predetermined periodic time". The above-described periodic time may be determined based on, for example, (i) the voltage or SOC of at least one of the electric storage cell 222 and the electric storage cell 224, (ii) the current value of current flowing in the inductor 250 and (iii) combinations thereof.

The switching operation may include (i) a first operation in which the switching element 252 is turned on and the switching element 254 is turned off, and (ii) a second operation in which the switching element 252 is turned off and the switching element 254 is turned on. The switching operation may include, in addition to the first operation and the second operation, a third operation in which both the switching element 252 and the switching element 254 are turned off. The order of the first operation, second operation and third operation may be arbitrarily determined, but it is preferable to perform the second operation following the first operation. The switching operation may include another operation that is different from the first operation, second operation and third operation described above.

In this embodiment, the voltage monitoring unit 280 monitors the voltage of at least one of the electric storage cell 222 and the electric storage cell 224. In this embodiment, the voltage monitoring unit 280 detects the voltage of the electric storage cell 222 and the voltage of the electric storage cell 224 by using the voltage detecting unit 282 and the voltage detecting unit 284. The voltage monitoring unit 280 inputs the voltage of the electric storage cell 222 and the voltage of the electric storage cell 224 to the difference detecting unit 286, and detects the voltage difference between the electric storage cell 222 and the electric storage cell 224. The voltage monitoring unit 280 generates a signal φ26 indicating the detected voltage difference and sends it to the module control unit 290. The signal φ26 may include information indicating whether the voltage of the electric storage cell 222 or the voltage of the electric storage cell 224 is greater.

In this embodiment, the module control unit 290 controls the balance correction circuit 232. The module control unit 290 may control the balance correction circuit 232 via the equalization control unit 270.

In an embodiment, the module control unit 290 determines a direction to transfer charges. For example, the module control unit 290 determines, based on the voltages or SOCs of the electric storage cell 222 and the electric storage cell 224, (i) to transfer charges from the electric storage cell 222 to the electric storage cell 224 or (ii) to transfer charges from the electric storage cell 224 to the electric storage cell 222. The module control unit 290 may send, to the equalization control unit 270, the operation control signal φ28 including information indicating a direction to transfer charges.

In another embodiment, the module control unit 290 estimates a net amount of charges transferred between the electric storage cell 222 and the electric storage cell 224 (which may be referred to as transfer amount of charges). For example, the module control unit 290 estimates the transfer amount of charges based on (i) an operating time of the balance correction circuit 232 and (ii) an actual measured value or estimated value of the current value of current that flowed in the inductor 250. The module control unit 290 may control the balance correction circuit 232 based on the estimated value of the transfer amount of charges. The module control unit 290 may send, to the equalization control unit 270, the operation control signal φ28 including information indicating the estimated value of the transfer amount of charges. The module control unit 290 may be an example of a charge transfer amount estimating device which estimates, based on an operating time of the balance correction device and the value of a valley in the absolute value of the current value of the inductor current during an operating period of the balance correction device or a target condition of the valley, a net amount of charges transferred between two electric storage cells during the operating period of the balance correction device.

The module control unit 290 may estimate the time from when the balance correction circuit 232 is operated until when it is stopped. For example, the module control unit 290 estimates, based on the voltage difference between the electric storage cell 222 and the electric storage cell 224 immediately before or after the balance correction circuit 232 is operated and the estimated value of the transfer amount of charges, the time from when the balance correction circuit 232 is operated until when it is stopped. The module control unit 290 may be an example of a working time estimating device which estimates, based on the voltage difference between two electric storage cells subject to operation of the balance correction device and the value of a valley in the absolute value of the current value of the inductor current during an operating period of the balance correction device or a target condition of the valley, the time until the balance correction device is stopped or the time at which it is stopped.

In yet another embodiment, the module control unit 290 determines at least one of whether or not to operate the balance correction circuit 232 and whether or not to stop the balance correction circuit 232. The module control unit 290 sends, to the equalization control unit 270, the operation control signal φ28 including information indicating at least one of whether or not to operate the balance correction circuit 232 and whether or not to stop the balance correction circuit 232.

[Timing to Operate the Balance Correction Circuit 232]

In this embodiment, the module control unit 290 sends, to the equalization control unit 270, the operation control signal φ28 including information indicating to operate the balance correction circuit 232 which is stopping. For example, the module control unit 290 sends the above-described operation control signal φ28 to the equalization control unit 270 at a timing to operate the balance correction circuit 232. The module control unit 290 may send, to the equalization control unit 270, the operation control signal φ28 including information indicating a timing to operate the balance correction circuit 232 and information indicating to operate the balance correction circuit 232 at the timing.

The module control unit 290 may determine, based on the voltages or SOCs of the electric storage cell 222 and the electric storage cell 224, a timing to operate the balance correction circuit 232 which is stopping. For example, the module control unit 290 determines, when the voltage or SOC of at least one of the electric storage cell 222 and the electric storage cell 224 satisfies a predetermined first condition, to operate the balance correction circuit 232. Examples of the above-described first condition can include (i) a condition that the difference between the voltages or SOCs of the electric storage cell 222 and the electric storage cell 224 is greater than a predetermined first value, (ii) a condition that the voltage or SOC of at least one of the electric storage cell 222 and the electric storage cell 224 matches a value determined according to the voltages or SOCs of the electric storage cell 222 and the electric storage cell 224, and the like.

[Timing to Stop the Balance Correction Circuit 232]

In this embodiment, the module control unit 290 sends, to the equalization control unit 270, the operation control signal φ28 including information indicating to stop the balance correction circuit 232 which is operating. For example, the module control unit 290 sends the above-described operation control signal φ28 to the equalization control unit 270 at a timing to stop the balance correction circuit 232. The module control unit 290 may send, to the equalization control unit 270, the operation control signal φ28 including information indicating a timing to stop the balance correction circuit 232 and information indicating to stop the balance correction circuit 232 at the timing.

First Embodiment for Determining a Timing to Stop the Balance Correction Circuit 232

The module control unit 290 may determine a timing to stop the balance correction circuit 232 based on a transfer amount of charges between two electric storage cells. For example, the module control unit 290 estimates a transfer amount of charges between the electric storage cell 222 and the electric storage cell 224, and estimates the SOC of at least one of the electric storage cell 222 and the electric storage cell 224 based on the estimated value of the transfer amount of charges. The module control unit 290 determines, when the estimated value of the SOC satisfies a predetermined second condition, to stop the balance correction circuit 232. Examples of the above-described second condition can include (i) a condition that the SOC of the electric storage cell 222 or the electric storage cell 224 matches a predetermined second value, (ii) a condition that the SOC of the electric storage cell 222 or the electric storage cell 224 is within a predetermined range of numerical values, (iii) a condition that the SOC of the electric storage cell 222 or the electric storage cell 224 matches a value determined according to the SOCs of the electric storage cell 222 and the electric storage cell 224, and the like.

For example, a lithium-ion battery using a lithium compound containing an iron component as a positive electrode material has charging characteristics representing a curve in which the voltage rises very gently in a voltage flat portion which appears from the initial period to the middle period of charging, while the battery voltage rises steeply at the end period of charging. Therefore, if at least one of the electric storage cell 222 and the electric storage cell 224 includes a lithium-ion battery including a lithium compound containing an iron component as a positive electrode material, it is difficult to manage the SOC of the electric storage cell based on the inter-terminal voltage of the electric storage cell. However, even in such a case, the module control unit 290 determines a timing to stop the balance correction circuit 232 based on the estimated transfer amount of charges, and thereby the module control unit 290 can stop the balance correction circuit 232 at an appropriate timing. Examples of the lithium compound containing an iron component can include an iron phosphate-based lithium compound. Examples of the iron phosphate-based lithium compound can include lithium iron phosphate.

Second Embodiment for Determining a Timing to Stop the Balance Correction Circuit 232

The module control unit 290 may determine, based on the voltages or SOCs of the electric storage cell 222 and the electric storage cell 224, a timing to stop the balance correction circuit 232. For example, the module control unit 290 determines, when the voltage or SOC of at least one of the electric storage cell 222 and the electric storage cell 224 satisfies a predetermined third condition, to stop the balance correction circuit 232. Examples of the above-described third condition can include (i) a condition that the difference between the voltages or SOCs of the electric storage cell 222 and the electric storage cell 224 is smaller than a predetermined third value, (ii) a condition that the voltage or SOC of at least one of the electric storage cell 222 and the electric storage cell 224 matches a value determined according to the voltages or SOCs of the electric storage cell 222 and the electric storage cell 224, and the like. The third value may be smaller than the first value.

According to an embodiment, for example, the module control unit 290 receives the signal φ26 from the voltage monitoring unit 280, and acquires information indicating the voltage difference between the electric storage cell 222 and the electric storage cell 224. The module control unit 290 (i) determines, when the voltage difference between the electric storage cell 222 and the electric storage cell 224 is equal to a predetermined value or smaller than a predetermined value, to stop the balance correction circuit 232, and (ii) sends, to the equalization control unit 270, the operation control signal φ28 including information indicating to stop the balance correction circuit 232.

The equalization control unit 270 receives the operation control signal φ28 and then stops the balance correction circuit 232 by supplying the drive signal φ22 and the drive signal φ24 such that both the switching element 252 and the switching element 254 are turned off. In this manner, the balance correction circuit 232 stops with equalization of the electric storage cell 222 and the electric storage cell 224 being almost ended. As a result, hunting in the balance correction circuit 232 can be prevented, and power consumption of the balance correction circuit 232 can be reduced.

According to another embodiment, for example, the module control unit 290 receives the signal φ26 from the voltage monitoring unit 280, and acquires information indicating the voltage difference between the electric storage cell 222 and the electric storage cell 224. The module control unit 290 (i) determines to stop the balance correction circuit 232 near a timing when the magnitude relation between the voltage of the electric storage cell 222 and the voltage of the electric storage cell 224 is reversed, and (ii) sends, to the equalization control unit 270, the operation control signal φ28 including information indicating to stop the balance correction circuit 232. For example, the module control unit 290 determines to stop the balance correction circuit 232 after the magnitude relation between the voltage of the electric storage cell 222 and the voltage of the electric storage cell 224 is reversed during an operating period of the balance correction circuit 232 and when the absolute value of the voltage difference between the electric storage cell 222 and the electric storage cell 224 while the balance correction circuit 232 operates is equal to the first threshold or smaller than the first threshold. According to this embodiment, the balance correction circuit 232 stops with the voltage difference between the electric storage cell 222 and the electric storage cell 224 being very small.

When equalizing the voltages of the electric storage cell 222 and the electric storage cell 224, those skilled in the art would typically attempt to control the drive signal φ22 and the drive signal φ24 such that an ON time of the switching element 252 and an ON time of the switching element 254 are equal. However, it is difficult that an ON time of the switching element 252 and an ON time of the switching element 254 precisely coincide due to precision, manufacturing error or the like of the switching element 252, the switching element 254 and the balance correction circuit 232.

Therefore, it is difficult to precisely equalize the voltage of the electric storage cell 222 and the voltage of the electric storage cell 224 by controlling the drive signal φ22 and the drive signal φ24 such that an ON time of the switching element 252 and an ON time of the switching element 254 are equal. However, even if the voltage difference between two adjacent electric storage cells is small, as the number of electric storage cells included in the electric storage system increases, the voltage difference between two adjacent electric storage cells is accumulated and becomes unignorable on the scale of the entire system.

According to this embodiment, the balance correction circuit 232 is stopped after the magnitude relation between the voltage of the electric storage cell 222 and the voltage of the electric storage cell 224 is reversed, and therefore it can be further ensured to create a timing when the voltage difference between the electric storage cell 222 and the electric storage cell 224 becomes zero, compared to the case where the drive signal φ22 and the drive signal φ24 are controlled such that an ON time of the switching element 252 and an ON time of the switching element 254 are equal. In this manner, the precision of equalizing the voltages of the electric storage cell 222 and the electric storage cell 224 can be improved. As a result, hunting in the balance correction circuit 232 can be prevented, and power consumption of the balance correction circuit 232 can be reduced.

Also, for example, if the voltage of the electric storage cell 222 is higher than the voltage of the electric storage cell 224, the measured value of the voltage of the electric storage cell 222 increases (which may be referred to as apparent voltage variation) after the balance correction circuit 232 stops, due to voltage drop caused by the internal resistance of the electric storage cell 222 or the like. On the other hand, the measured value of the voltage of the electric storage cell 224 decreases (which may be referred to as apparent voltage variation) due to voltage drop caused by the internal resistance of the electric storage cell 224 or the like.

Therefore, if the module control unit 290 stops the balance correction circuit 232 before the magnitude relation between the voltage of the electric storage cell 222 and the voltage of the electric storage cell 224 is reversed, the absolute value of the voltage difference between the electric storage cell 222 and the electric storage cell 224 increases over time after the balance correction circuit 232 stops. In contrast, if the module control unit 290 stops the balance correction circuit 232 after the magnitude relation between the voltage of the electric storage cell 222 and the voltage of the electric storage cell 224 is reversed, the absolute value of the voltage difference between the electric storage cell 222 and the electric storage cell 224 decreases over time after the balance correction circuit 232 stops. As a result, the absolute value of the voltage difference between the electric storage cell 222 and the electric storage cell 224 while the balance correction circuit 232 stops can be made smaller.

The first threshold may be determined in consideration of the apparent voltage variation of the electric storage cell 222 caused when the balance correction circuit 232 stops. The first threshold may be determined based on the current value of the inductor 250 and the value of the DC resistance (which may be referred to as DCR) of the electric storage cell 222. The first threshold may be determined by, assuming that the DC resistance values of the electric storage cell 222 and the electric storage cell 224 are substantially equal, multiplying a current value of the inductor 250 and a DC resistance value of the electric storage cell 222.

The first threshold may be determined in consideration of the apparent voltage variation of the electric storage cell 222 and the electric storage cell 224 caused when the balance correction circuit 232 stops. The first threshold may be determined based on the current value of the inductor 250, the DC resistance value of the electric storage cell 222 and the DC resistance value of the electric storage cell 224. The first threshold may be determined by halving a value obtained by multiplying the sum of the DC resistance value of the electric storage cell 222 and the DC resistance value of the electric storage cell 224 by the average current value of the inductor 250.

The DC resistance value of the electric storage cell 222 changes according to the temperature and deterioration condition of the electric storage cell 222. Accordingly, the first threshold may be determined in consideration of at least one of the temperature and deterioration condition of the electric storage cell 222. The DC resistance value of the electric storage cell 224 changes according to the temperature and deterioration condition of the electric storage cell 224. Accordingly, the first threshold may be determined in consideration of at least one of the temperature and deterioration condition of the electric storage cell 224. For example, the first threshold may be determined using a value obtained by multiplying the DC resistance values of the electric storage cell 222 and the electric storage cell 224 at the time of shipment by a predetermined coefficient. The predetermined coefficient may be 1 or more and 3 or less, and is preferably more than 1 and 2 or less.

Assuming that the balance correction circuit 232 stays stopped after the equalization control unit 270 stops the balance correction circuit 232, the first threshold may be determined such that the absolute value of the voltage difference between the electric storage cell 222 and the electric storage cell 224 at a point of time when a predetermined time has elapsed after the balance correction circuit 232 is stopped is equal to or less than a second threshold. The absolute value of the second threshold may be smaller than the absolute value of the first threshold. The predetermined time may be determined in consideration of at least one of the variation width of voltage variation due to voltage drop and the duration of the voltage variation.

The above-described predetermined time may be the time until the variation width of voltage variation due to voltage drop reaches 60% (preferably 75%, and further preferably 80%) of the final variation width at a point of time when the voltage variation almost ends. Note that voltage variation due to voltage drop typically ends in approximately 30 minutes to 1 hour. The above-described predetermined time may be 0.5 seconds or more and 5 minutes or less, and is preferably 1 second or more and 2 minutes or less and more preferably 1 second or more and 1 minute or less.

The first threshold may be 0.5 mV or more and 100 mV or less. The first threshold is more preferably 0.5 mV or more and 10 mV or less and further preferably 0.5 mV or more and 5 mV or less. In typical use, by setting the first threshold within the above-described range, the absolute value of the voltage difference between the electric storage cell 222 and the electric storage cell 224 at a point of time when the voltage variation due to the voltage drop almost ends can be made smaller than the absolute value of the voltage difference between the electric storage cell 222 and the electric storage cell 224 at a point of time when the balance correction circuit 232 is stopped. As a result, the precision of equalization by the balance correction circuit 232 can be improved. Also, hunting in the balance correction circuit 232 can be suppressed.

It is preferable that the module control unit 290 stops the balance correction circuit 232 for a predetermined period of time after the balance correction circuit 232 is stopped. In this manner, hunting in the balance correction circuit 232 can be prevented in a more effective manner. The above-described predetermined period of time may be 0.5 second or more and 5 minutes or less, and is preferably 1 second or more and 2 minutes or less and more preferably 1 second or more and 1 minute or less.

Third Embodiment for Determining a Timing to Stop the Balance Correction Circuit 232

Examples of a third embodiment for determining a timing to stop the balance correction circuit 232 based on the voltage of the electric storage cell 222 and the voltage of the electric storage cell 224 can include the following. In this embodiment, a switching operation includes a first operation, a second operation and a third operation. In this embodiment, the equalization control unit 270 supplies the drive signal $\varphi 22$ and the drive signal $\varphi 24$ such that the ratio of the time of the third operation relative to the periodic time of the switching operation increases as the voltage difference between the electric storage cell 222 and the electric storage cell 224 decreases.

The equalization control unit 270 may determine the time of the third operation based on the voltage difference between the electric storage cell 222 and the electric storage cell 224 and according to a predetermined method. At the beginning of operation, the time of the third operation may be zero seconds. The time of the first operation and the time of the second operation may be equal. The time of the first operation and the time of the second operation may be determined in a similar manner to the second embodiment.

In this embodiment, the module control unit 290 determines, when the time of the third operation or the ratio of the time of the third operation relative to the periodic time of the switching operation is equal to a predetermined value or greater than a predetermined value, to stop the balance correction circuit 232. According to this embodiment, the equalization control unit 270 stops the balance correction circuit 232 at a timing when the voltage difference between the electric storage cell 222 and the electric storage cell 224 becomes sufficiently small. As a result, hunting in the balance correction circuit 232 can be prevented, and power consumption of the balance correction circuit 232 can be reduced.

Fourth Embodiment for Determining a Timing to Stop the Balance Correction Circuit 232

Examples of a fourth embodiment for determining a timing to stop the balance correction circuit 232 based on the voltage of the electric storage cell 222 and the voltage of the electric storage cell 224 can include the following. In this embodiment, the equalization control unit 270 supplies the drive signal $\varphi 22$ and the drive signal $\varphi 24$ such that the periodic time of the switching operation decreases as the voltage difference between the electric storage cell 222 and the electric storage cell 224 decreases.

The equalization control unit 270 may determine the periodic time of the switching operation based on the voltage difference between the electric storage cell 222 and the electric storage cell 224 and according to a predetermined method. The time of the first operation and the time of the second operation may be equal. The time of the first operation and the time of the second operation may be determined in a similar manner to the second embodiment. The switching operation may or may not include the third operation. The ratio of the time of the third operation relative to the periodic time of the switching operation may be determined in a similar manner to the third embodiment.

In this embodiment, the module control unit 290 determines, when the periodic time of the switching operation is equal to a predetermined value or smaller than a predetermined value, to stop the balance correction circuit 232. According to this embodiment, the balance correction circuit 232 stops at a timing when the voltage difference between the electric storage cell 222 and the electric storage cell 224 becomes sufficiently small. Also, the balance correction circuit 232 stops at a point of time when the equalization ends, and therefore power consumption of the balance correction circuit 232 can be reduced.

[Specific Configurations of the Equalization Control Unit 270]

Figure 3:
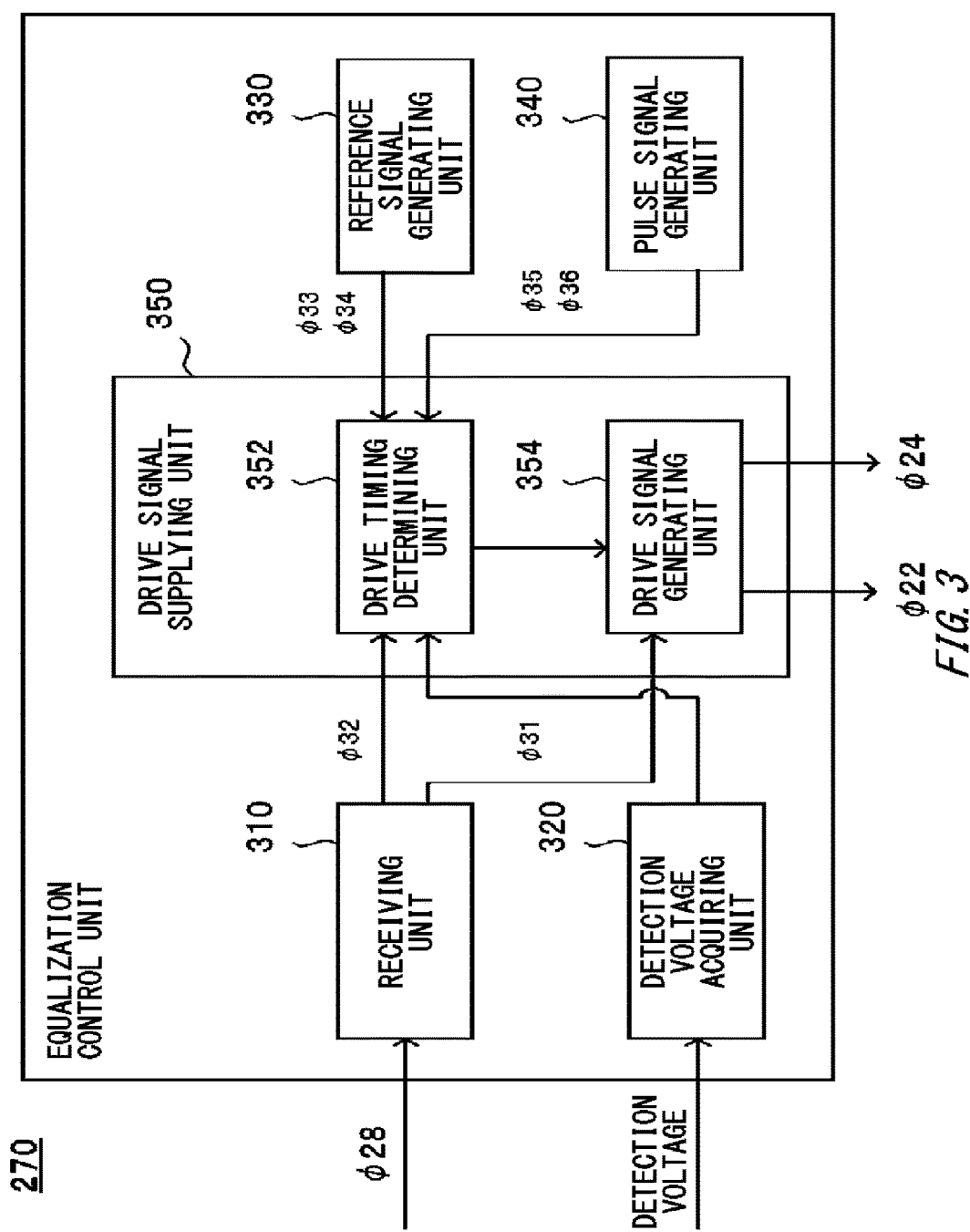
FIG. 3 schematically shows an example of an equalization control unit 270.

FIG. 3 schematically shows an example of the equalization control unit 270. In this embodiment, the equalization control unit 270 includes a receiving unit 310, a detection voltage acquiring unit 320, a reference signal generating unit 330, a pulse signal generating unit 340 and a drive signal supplying unit 350. In this embodiment, the drive signal supplying unit 350 includes a drive timing determining unit 352 and a drive signal generating unit 354.

The detection voltage acquiring unit 320 may be an example of a current information acquiring unit. The drive signal supplying unit 350 may be an example of a control signal supplying unit. The drive timing determining unit 352 may be an example of a first timing determining unit or a second timing determining unit. The drive signal generating unit 354 may be an example of a control signal generating unit.

In this embodiment, the receiving unit 310 receives the operation control signal $\varphi 28$ from the module control unit 290. In an embodiment, the receiving unit 310 forwards the operation control signal $\varphi 28$ to the drive signal supplying unit 350. In another embodiment, the receiving unit 310 generates at least one of a signal $\varphi 31$ and a signal $\varphi 32$ based on the operation control signal $\varphi 28$. The signal $\varphi 31$ includes information indicating to operate the balance correction circuit 232 or information indicating to stop the balance correction circuit 232. The signal $\varphi 32$ includes information indicating a direction to transfer charges. For example, the receiving unit 310 sends the signal $\varphi 31$ to the drive signal generating unit 354 and sends the signal $\varphi 32$ to the drive timing determining unit 352.

In this embodiment, the detection voltage acquiring unit 320 acquires information about the current value of current flowing in the inductor 250. For example, the detection voltage acquiring unit 320 acquires information indicating voltage drop at a current detecting resistance for detecting the current value of current flowing in the inductor 250 (which may be referred to as inductor current). In this embodiment, the detection voltage acquiring unit 320 acquires (i) information indicating the degree of voltage drop at a current detecting resistance arranged at any position in the first open/close circuit and (ii) information indicating the degree of voltage drop at a current detecting resistance arranged at any position in the second open/close circuit. The current value of the inductor current may be calculated from the current values of current flowing in the first switching element and the second switching element.

In this embodiment, the reference signal generating unit 330 generates a reference signal. The reference signal generating unit 330 sends the reference signal to the drive timing determining unit 352. The reference signal is referenced when the drive timing determining unit 352 determines, based on the current value of the inductor current or a detection voltage for the inductor current, a timing to supply the drive signal φ22 and the drive signal φ24. The reference signal may be used, by the drive timing determining unit 352, for determining a timing to supply at least one of the first control signal, the second control signal and the third control signal.

In an embodiment, the reference signal generating unit 330 generates a reference signal φ33 which is used when charges are to be transferred from the electric storage cell 222 to the electric storage cell 224. In another embodiment, the reference signal generating unit 330 generates a reference signal φ34 which is used when charges are to be transferred from the electric storage cell 224 to the electric storage cell 222.

The reference signal is input to the drive timing determining unit 352 as a reference voltage, for example. The reference voltage may have a predetermined voltage waveform. The reference voltage may also have a voltage waveform determined according to the voltage of at least one of the electric storage cell 222 and the electric storage cell 224. The reference signal may include a triangular wave, sawtooth wave or trapezoidal wave having a gradient according to an estimated value of the decrease rate of the absolute value of the current value of the inductor current.

For example, the reference signal φ33 includes a triangular wave, sawtooth wave or trapezoidal wave having a gradient according to an estimated value of the decrease rate of the absolute value of the current value of the inductor current flowing in the second open/close circuit when the switching element 252 is turned off. On the other hand, the reference signal φ34 includes a triangular wave, sawtooth wave or trapezoidal wave having a gradient according to an estimated value of the decrease rate of the absolute value of the current value of the inductor current flowing in the first open/close circuit when the switching element 254 is turned off.

The reference signal may include information about an estimated value of the current value of the inductor current at a timing to supply the drive signal φ22 or the drive signal φ24. For example, if the reference signal is input to the drive timing determining unit 352 as a reference voltage, the reference voltage may be a voltage according to the estimated value of the current value of the inductor current described above. Also, the reference voltage may have a pulse waveform having a peak value according to the estimated value of the current value of the inductor current described above. The shape of the pulse waveform may be a rectangular shape, a trapezoidal shape, a triangular shape, or a sawtooth shape. The position of generation of a pulse may be set near a timing when the drive signal φ22 or the drive signal φ24 is to be supplied.

The current value of the inductor current at a timing to supply the drive signal φ22 or the drive signal φ24 is calculated based on, for example, an estimated value of the decrease rate of the absolute value of the current value of the inductor current. The timing to supply the drive signal φ22 or the drive signal φ24 is calculated based on, for example, an estimated value of the decrease rate of the absolute value of the current value of the inductor current.

The estimated value of the decrease rate of the absolute value of the current value of the inductor current is represented as, for example, $V/L$ using any voltage value V and the inductance L of the inductor 250. The gradient of a triangular wave or sawtooth wave for the reference voltage is represented as $R \times V/L$ using the resistance value R of a resistor for current detection (which is, in this embodiment, the resistance value of the internal resistance of the switching element 252 or the switching element 254), any voltage value V and the inductance L of the inductor 250.

Examples of any voltage value V can include (i) the voltage value of the electric storage cell 222 or the electric storage cell 224 at the beginning of the switching operation, (ii) the average value of the voltage values of the electric storage cell 222 and the electric storage cell 224 at the beginning of the switching operation, (iii) the voltage value of the electric storage cell 222 or the electric storage cell 224 at any point of time during the switching operation, (iv) the average value of the voltage values of the electric storage cell 222 and the electric storage cell 224 at any point of time during the switching operation, (v) any value in a voltage flat region in the charge-discharge curve of the electric storage cell 222 or the electric storage cell 224, (vi) the representative voltage of the electric storage cell 222 or the electric storage cell 224, and the like. Examples of the representative voltage can include (i) the nominal voltage, (ii) the upper limit value, the lower limit value or the average value in a voltage range expected to be used, and the like.

The reference signal generating unit 330 may adjust an offset for the triangular wave or sawtooth wave having a gradient according to an estimated value of the decrease rate of the absolute value of the current value of the inductor current, and supply the drive timing determining unit 352 with the adjusted signal. The reference signal generating unit 330 may store a plurality of types of the reference signal. The reference signal generating unit 330 may select one of the plurality of types of the reference signal and supply the drive timing determining unit 352 with the selected signal.

In this embodiment, the pulse signal generating unit 340 generates a pulse signal. The pulse signal may be a series of pulses at a predetermined periodic time. In an embodiment, the pulse signal generating unit 340 generates a set signal φ35 for specifying a periodic time of the switching operation. In another embodiment, the pulse signal generating unit 340 generates a reset signal φ36 for specifying a maximum value of the duty ratio of the drive signal φ22 or the drive signal φ24.

The pulse signal generating unit 340 may be a variable pulse generator which variably controls the duty ratio of at least one of the drive signal φ22 and the drive signal φ24. The duty ratio of the drive signal φ22 is calculated as the ratio of an ON period of the drive signal φ22 relative to the periodic time of the switching operation, for example. Similarly, the duty ratio of the drive signal φ24 is calculated as the ratio of an ON period of the drive signal φ24 relative to the periodic time of the switching operation.

In this embodiment, the drive signal supplying unit 350 supplies the switching element 252 and the switching element 254 with the drive signal φ22 and the drive signal φ24 such that, during an operating period of the balance correction circuit 232, the balance correction circuit 232 repeatedly performs the switching operation. For example, during at least part of an operating period of the balance correction circuit 232, the drive signal supplying unit 350 supplies the switching element 252 and the switching element 254 with the drive signal φ22 and the drive signal φ24, such that a valley in the absolute value of the current value (which may be referred to as valley current value) satisfies a predetermined condition, based on the information about the current value of the inductor current acquired by the detection voltage acquiring unit 320.

In an embodiment, the drive signal supplying unit 350 supplies the drive signal φ22 and the drive signal φ24 such that (i) the valley current value is equal to a first value, (ii)

the valley current value is greater than the above-described first value or (iii) the valley current value is within a range of numerical values including the above-described first value. The above-described first value may be a predetermined value, or may be a value determined based on the value of the voltage or SOC of at least one of the electric storage cell 222 and the electric storage cell 224. The above-described range of numerical values may be a predetermined range, or may be a range determined based on the value of the voltage or SOC of at least one of the electric storage cell 222 and the electric storage cell 224.

In this embodiment, the drive timing determining unit 352 determines a timing to supply the drive signal φ22 and the drive signal φ24. In an embodiment, the drive timing determining unit 352 determines a timing to supply the first control signal for turning on the switching element 252 and turning off the switching element 254. In another embodiment, the drive timing determining unit 352 determines a timing to supply the second control signal for turning off the switching element 252 and turning on the switching element 254. In yet another embodiment, the drive timing determining unit 352 determines a timing to supply the third control signal for turning off the switching element 252 and turning off the switching element 254.

First Embodiment where Charges are Transferred from the Electric Storage Cell 222 to the Electric Storage Cell 224

When charges are to be transferred from the electric storage cell 222 to the electric storage cell 224, the drive timing determining unit 352 determines to supply the first control signal at a predetermined periodic time, for example. The drive timing determining unit 352 may determine to supply the first control signal at a periodic time determined according to the voltage or SOC of at least one of the electric storage cell 222 and the electric storage cell 224 or the voltage difference or the difference in SOC between them. Also, the drive timing determining unit 352 determines to supply the second control signal at (i) a timing when the absolute value of the current value of the inductor current exceeds a reference value determined based on an estimated value of the decrease rate of the absolute value of the current value of the inductor current in the second operation, or (ii) a timing when an ON time of the drive signal φ22 exceeds a predetermined period of time. The above-described reference value may be determined based on a target value of the valley current value of the inductor current and an estimated value of the decrease rate of the absolute value of the current value of the inductor current in the second operation.

For example, the drive timing determining unit 352 acquires the detection voltage for the inductor current from the detection voltage acquiring unit 320. The drive timing determining unit 352 receives the reference signal from the reference signal generating unit 330. The voltage waveform indicated by the reference signal is determined based on an estimated value of the decrease rate of the absolute value of the current value of the inductor current in the second operation. The drive timing determining unit 352 compares the voltage waveform of the reference signal and the detection voltage and determines, when they coincide, to supply the second control signal.

The drive timing determining unit 352 may determine, when the absolute value of the current value of the inductor current does not exceed the reference value indicated by the reference signal within a predetermined first period, to supply the second control signal at a timing when the first period has elapsed. For example, the drive timing determining unit 352 receives, from the pulse signal generating unit 340, the pulse signal for specifying a maximum value of the duty ratio of the drive signal φ22. The drive timing determining unit 352 may judge whether the above-described first period has elapsed based on the above-described pulse signal.

Second Embodiment where Charges are Transferred from the Electric Storage Cell 222 to the Electric Storage Cell 224

When charges are to be transferred from the electric storage cell 222 to the electric storage cell 224, the drive timing determining unit 352 determines to supply the first control signal at a predetermined periodic time, for example. The drive timing determining unit 352 may determine to supply the first control signal at a periodic time determined according to the voltages or SOCs of the electric storage cell 222 and the electric storage cell 224 or the voltage difference or the difference in SOC between them. Also, the drive timing determining unit 352 determines to supply the third control signal at a timing when the absolute value of the current value of the inductor current exceeds a reference value determined based on an estimated value of the decrease rate of the absolute value of the current value of the inductor current in the third operation. Also, the drive timing determining unit 352 determines to supply the second control signal or the third control signal at a timing when an ON time of the drive signal φ22 exceeds a predetermined period of time.

For example, the drive timing determining unit 352 acquires the detection voltage for the inductor current from the detection voltage acquiring unit 320. The drive timing determining unit 352 receives the reference signal from the reference signal generating unit 330. The voltage waveform indicated by the reference signal is determined based on the estimated value of the decrease rate of the absolute value of the current value of the inductor current in the third operation. The drive timing determining unit 352 compares the voltage waveform of the reference signal and the detection voltage and determines, when they coincide, to supply the third control signal.

The drive timing determining unit 352 may determine, when the absolute value of the current value of the inductor current does not exceed the reference value indicated by the reference signal within a predetermined first period, to supply the second control signal or the third control signal at a timing when the first period has elapsed. For example, the drive timing determining unit 352 receives, from the pulse signal generating unit 340, a pulse signal for specifying a maximum value of the duty ratio of the drive signal φ22. The drive timing determining unit 352 may judge whether the above-described first period has elapsed based on the above-described pulse signal.

First Embodiment where Charges are Transferred from the Electric Storage Cell 224 to the Electric Storage Cell 222

When charges are to be transferred from the electric storage cell 224 to the electric storage cell 222, the drive timing determining unit 352 determines to supply the second control signal at a predetermined periodic time, for example. The drive timing determining unit 352 may determine to supply the second control signal at a periodic time determined according to the voltage or SOC of at least one of the electric storage cell 222 and the electric storage cell 224 or the voltage difference or the difference in SOC between them. Also, the drive timing determining unit 352 determines to supply the first control signal at (i) a timing when the absolute value of the current value of the inductor current exceeds a reference value determined based on an estimated value of the decrease rate of the absolute value of the current value of the inductor current in the first operation, or (ii) a timing when an ON time of the drive signal φ24 exceeds a predetermined period of time. The above-described reference value may also be determined based on a target value of the valley current value of the inductor current and an estimated value of the decrease rate of the absolute value of the current value of the inductor current in the first operation.

For example, the drive timing determining unit 352 acquires the detection voltage for the inductor current from the detection voltage acquiring unit 320. The drive timing determining unit 352 receives the reference signal from the reference signal generating unit 330. The voltage waveform indicated by the reference signal is determined based on the estimated value of the decrease rate of the absolute value of the current value of the inductor current in the first operation. The drive timing determining unit 352 compares the voltage waveform of the reference signal and the detection voltage and determines, when they coincide, to supply the first control signal.

The drive timing determining unit 352 may determine, when the absolute value of the current value of the inductor current does not exceed the reference value indicated by the reference signal within a predetermined second period, to supply the first control signal at a timing when the second period has elapsed. For example, the drive timing determining unit 352 receives, from the pulse signal generating unit 340, a pulse signal for specifying a maximum value of the duty ratio of the drive signal φ24. The drive timing determining unit 352 may judge whether the above-described second period has elapsed based on the above-described pulse signal.

Second Embodiment where Charges are Transferred from the Electric Storage Cell 224 to the Electric Storage Cell 222

When charges are to be transferred from the electric storage cell 224 to the electric storage cell 222, the drive timing determining unit 352 determines to supply the second control signal at a predetermined periodic time, for example. The drive timing determining unit 352 may determine to supply the second control signal at a periodic time determined according to the voltage or SOC of at least one of the electric storage cell 222 and the electric storage cell 224 or the voltage difference or the difference in SOC between them. Also, the drive timing determining unit 352 determines to supply the third control signal at a timing when the absolute value of the current value of the inductor current exceeds a reference value determined based on an estimated value of the decrease rate of the absolute value of the current value of the inductor current in the third operation. Also, the drive timing determining unit 352 determines to supply the first control signal or the third control signal at a timing when an ON time of the drive signal φ24 exceeds a predetermined period of time. The above-described reference value may also be determined based on a target value of the valley current value of the inductor current and an estimated value of the decrease rate of the absolute value of the current value of the inductor current in the third operation.

For example, the drive timing determining unit 352 acquires the detection voltage for the inductor current from the detection voltage acquiring unit 320. The drive timing determining unit 352 receives the reference signal from the reference signal generating unit 330. The voltage waveform indicated by the reference signal is determined based on the estimated value of the decrease rate of the absolute value of the current value of the inductor current in the third operation. The drive timing determining unit 352 compares the voltage waveform of the reference signal and the detection voltage and determines, when they coincide, to supply the third control signal.

The drive timing determining unit 352 may determine, when the absolute value of the current value of the inductor current does not exceed the reference value indicated by the reference signal within a predetermined second period, to supply the first control signal or the third control signal at a timing when the second period has elapsed. For example, the drive timing determining unit 352 receives, from the pulse signal generating unit 340, a pulse signal for specifying a maximum value of the duty ratio of the drive signal φ24. The drive timing determining unit 352 may judge whether the above-described second period has elapsed based on the above-described pulse signal.

In this embodiment, the drive signal generating unit 354 generates the first control signal including the drive signal φ22 and the drive signal φ24 at a timing when the drive timing determining unit 352 determines to supply the first control signal, and sends the first control signal to the switching element 252 and the switching element 254. The drive signal generating unit 354 generates the second control signal including the drive signal φ22 and the drive signal φ24 at a timing when the drive timing determining unit 352 determines to supply the second control signal, and sends the second control signal to the switching element 252 and the switching element 254. The drive signal generating unit 354 generates the third control signal including the drive signal φ22 and the drive signal φ24 at a timing when the drive timing determining unit 352 determines to supply the third control signal, and sends the third control signal to the switching element 252 and the switching element 254.

When charges are to be transferred from the electric storage cell 222 to the electric storage cell 224, the drive signal generating unit 354 may generate, from when the balance correction circuit 232 starts or restarts to operate until when the drive timing determining unit 352 determines to supply the second control signal or the third control signal, the first control signal including the drive signal φ22 and the drive signal φ24 such that the duty ratio of the drive signal φ22 is greater than the duty ratio of the drive signal φ24. Similarly, when charges are to be transferred from the electric storage cell 224 to the electric storage cell 222, the drive signal generating unit 354 may generate, from when the balance correction circuit 232 starts or restarts to operate until when the drive timing determining unit 352 determines to supply the first control signal or the third control signal, the second control signal including the drive signal φ22 and the drive signal φ24 such that the duty ratio of the drive signal φ24 is greater than the duty ratio of the drive signal φ22.

Figure 4:
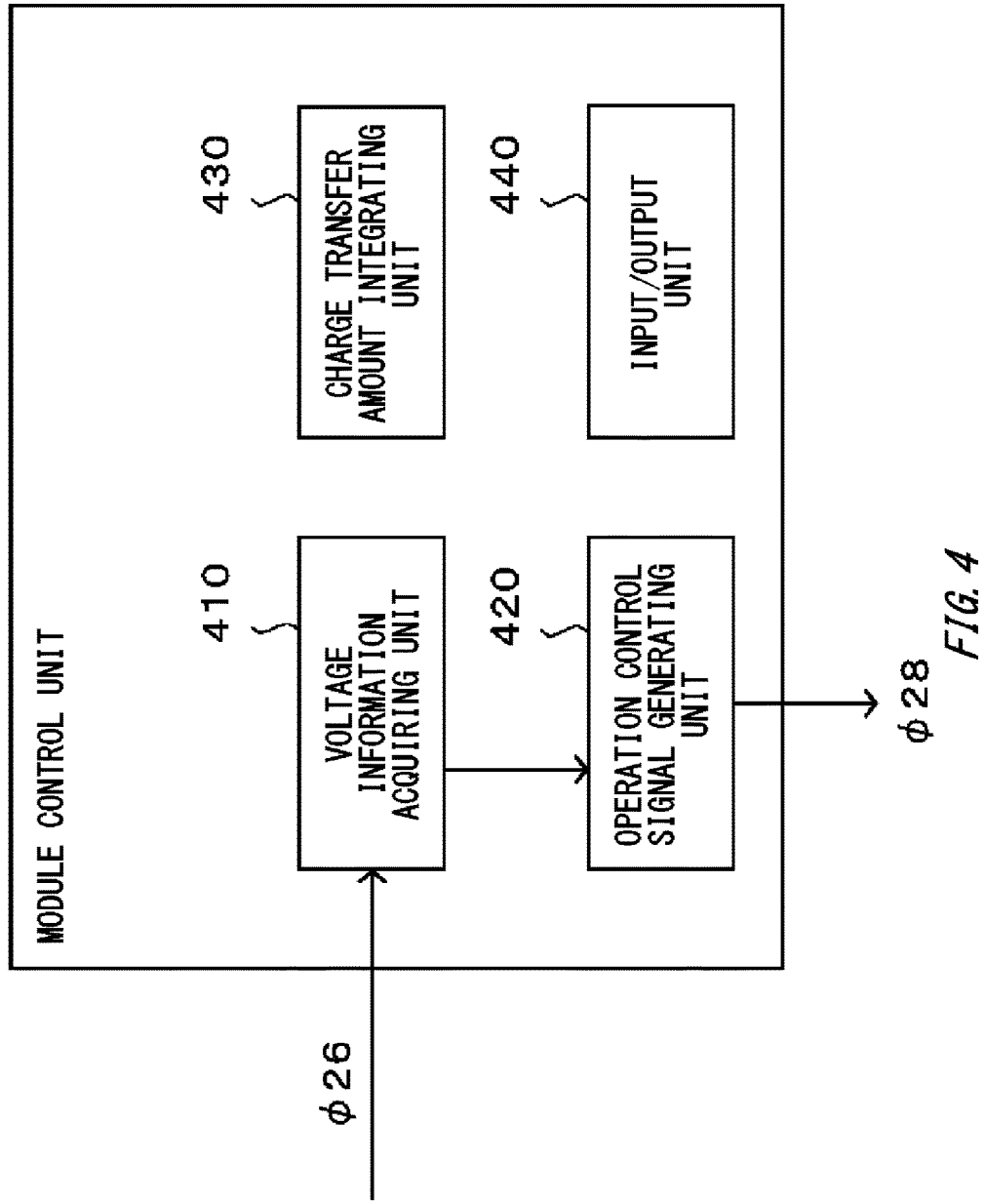
FIG. 4 schematically shows an example of an module control unit 290.

FIG. 4 schematically shows an example of the module control unit 290. In this embodiment, the module control unit 290 includes a voltage information acquiring unit 410, an operation control signal generating unit 420, a charge transfer amount integrating unit 430 and an input/output unit 440. The operation control signal generating unit 420 may be an example of a direction determining unit or an operation determining unit. The charge transfer amount integrating unit 430 may be an example of a charge transfer amount estimating unit.

In this embodiment, the voltage information acquiring unit 410 acquires information about the voltage of at least one of the electric storage cell 222 and the electric storage cell 224. For example, the voltage information acquiring unit 410 receives the signal φ26 from the difference detecting unit 286.

In this embodiment, the operation control signal generating unit 420 determines a direction to transfer charges. For example, the operation control signal generating unit 420 acquires information about the voltages of the electric storage cell 222 and the electric storage cell 224 from the voltage information acquiring unit 410. The operation control signal generating unit 420 determines, based on the information acquired from the voltage information acquiring unit 410, to transfer charges from one electric storage cell having a greater voltage or SOC to the other electric storage cell having a smaller voltage or SOC, selecting from two electric storage cells subject to operation of the balance correction circuit 232.

The operation control signal generating unit 420 determines whether or not to operate the balance correction circuit 232. The operation control signal generating unit 420 determines whether or not to stop the balance correction circuit 232. For example, the operation control signal generating unit 420 acquires information about the voltages of the electric storage cell 222 and the electric storage cell 224 from the voltage information acquiring unit 410. The operation control signal generating unit 420 determines whether or not to operate the balance correction circuit 232 based on the information acquired from the voltage information acquiring unit 410. Also, the operation control signal generating unit 420 determines whether or not to stop the balance correction circuit 232 based on the information acquired from the voltage information acquiring unit 410.

The operation control signal generating unit 420 generates the operation control signal φ28 including information indicating matters determined by the operation control signal generating unit 420. The operation control signal generating unit 420 sends the operation control signal φ28 to the equalization control unit 270.

In this embodiment, the charge transfer amount integrating unit 430 integrates the amount of charges transferred between the electric storage cell 222 and the electric storage cell 224 during an operating period of the balance correction circuit 232. The charge transfer amount integrating unit 430 may estimate the amount of charges transferred between the electric storage cell 222 and the electric storage cell 224 based on (i) an operating time of the balance correction circuit 232, and (ii) at least one of the information about the current value of the inductor current acquired by the detection voltage acquiring unit 320 and a condition about the valley current value of the inductor current used at the drive timing determining unit 352.

In this embodiment, the input/output unit 440 receives an input from a user. Also, the input/output unit 440 outputs information to the user. Examples of the input/output unit 440 can include (i) input devices such as keyboards, pointing devices, touch panels and microphones, (ii) output devices such as a variety of displays and speakers, (iii) communication devices or communication interfaces that send/receive information to/from another communication terminal, and the like.

Figure 5:
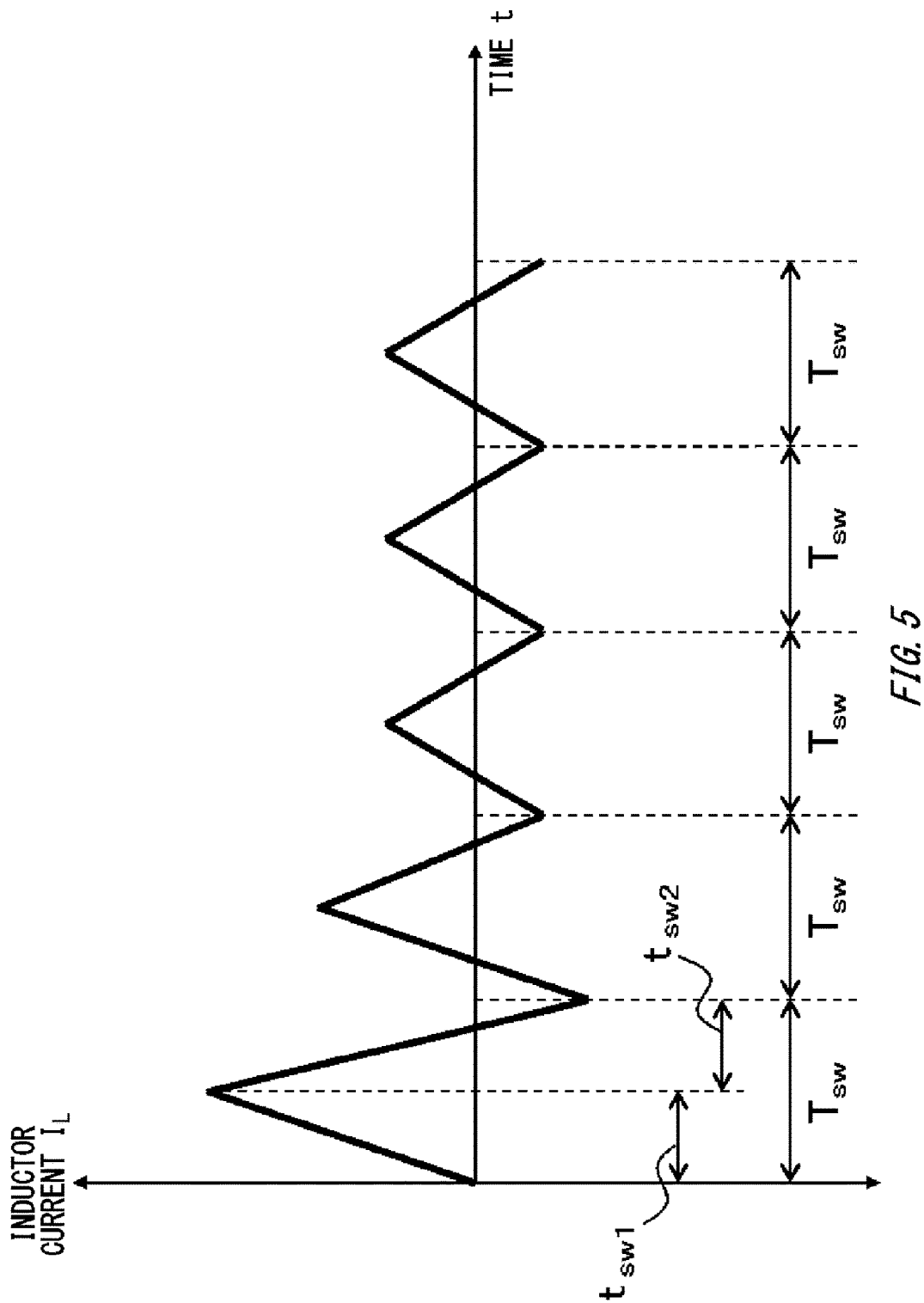
FIG. 5 schematically shows an example of an inductor current $I_L$ where a valley current value is not controlled.

FIG. 5 schematically shows an example of the inductor current $I_L$ where the valley current value is not controlled. In FIG. 5, the symbol $T_{sw}$ indicates a periodic time of the switching operation. The symbol $t_{sw1}$ indicates an ON period of the drive signal φ22. The symbol $t_{sw2}$ indicates an ON period of the drive signal φ24. The duty ratio of the drive signal φ22 is represented as $t_{sw1}/T_{sw}$. The duty ratio of the drive signal φ24 is represented as $t_{sw2}/T_{sw}$.

As shown in FIG. 5, the inductor current $I_L$ significantly increases or decreases if the valley current value is not controlled. Also, the positive and negative of the inductor current $I_L$ may be reversed, in some cases. Therefore, components constituting the balance correction circuit 232 are needed to have sufficient specifications, so that the cost and the implementation area are increased. Also, an actual value of the inductor current sometimes deviates from a range which allows the equalization to be efficiently performed, and the efficiency of the equalization is lowered. Further, it is difficult to precisely estimate the time required for the equalization.

Figure 6:
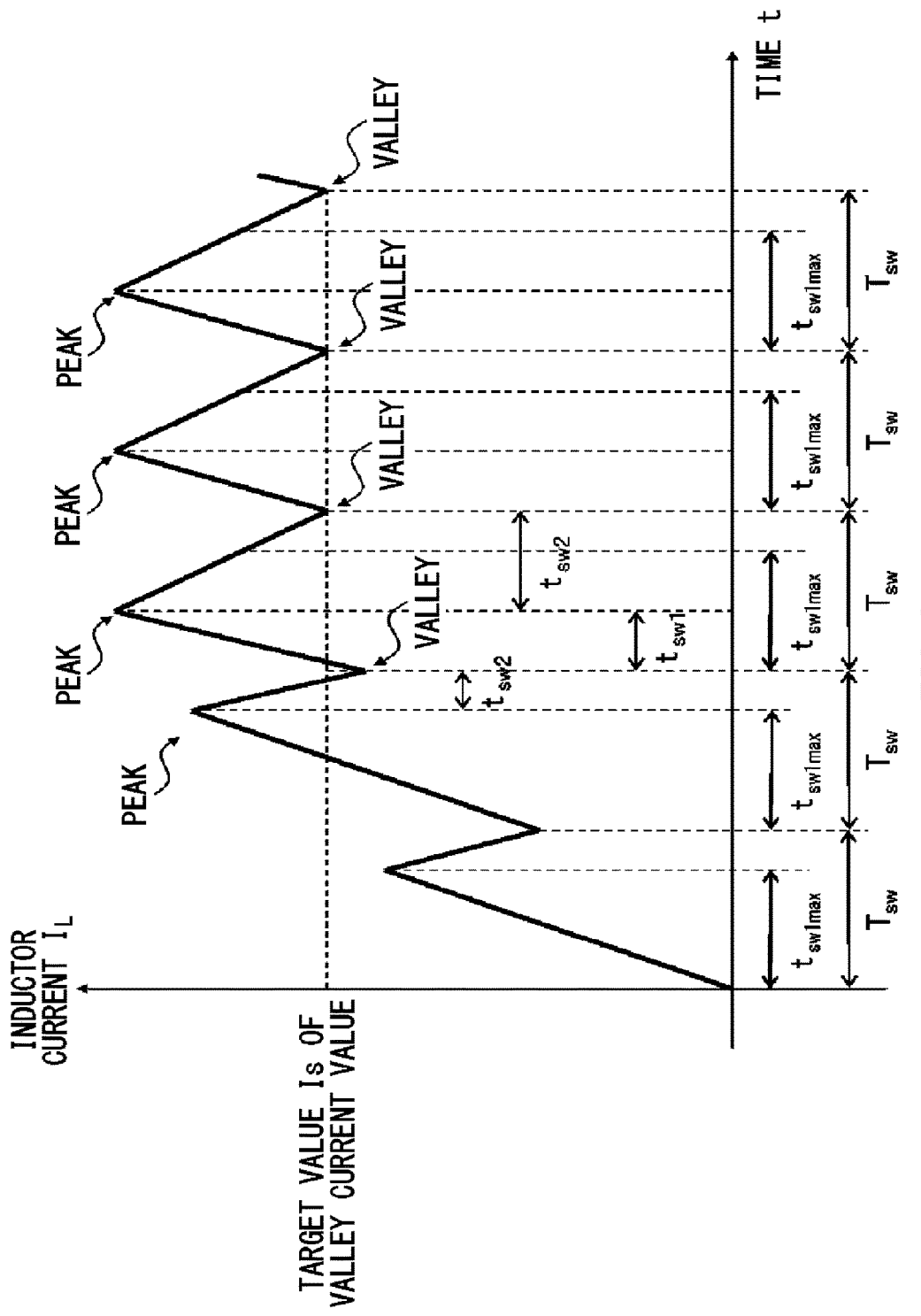
FIG. 6 schematically shows an example of the inductor current $I_L$ where the valley current value is controlled.

FIG. 6 schematically shows an example of the inductor current $I_L$ where the valley current value is controlled. FIG. 6 is used to describe the outline of a control method of the inductor current $I_L$ when charges are to be transferred from the electric storage cell 222 to the electric storage cell 224. Also, when charges are to be transferred from the electric storage cell 224 to the electric storage cell 222, the inductor current $I_L$ can be controlled similarly. In FIG. 6, the symbol $T_{sw}$ indicates a periodic time of the switching operation. The symbol $t_{sw1}$ indicates an ON period of the drive signal φ22. The symbol $t_{sw1max}$ indicates a maximum value of the ON period of the drive signal φ22. The symbol $t_{sw2}$ indicates an ON period of the drive signal φ24. The symbol Is indicates a target value of the valley current value.

In the embodiment in FIG. 6, when the module control unit 290 determines to operate the balance correction circuit 232, the drive timing determining unit 352 determines to supply the first control signal. Then, the switching element 252 is turned on and the switching element 254 is turned off, and thereby the absolute value of the current value of the inductor current $I_L$ increases over time. Until the absolute value of the current value of the inductor current $I_L$ increases to some extent, the drive timing determining unit 352 determines to supply the second control signal when the period $t_{sw1max}$ has elapsed after the switching element 252 is turned on. During that time, the valley current value of the inductor current $I_L$ is smaller than the target value Is of the valley current value.

When the balance correction circuit 232 repeatedly performs the switching operation and the absolute value of the current value of the inductor current $I_L$ increases to some extent, the drive timing determining unit 352 determines to supply the second control signal before the period $t_{sw1max}$ has elapsed after the switching element 252 is turned on. More specifically, the drive timing determining unit 352 determines to supply the second control signal or the third control signal at a timing when the absolute value of the current value of the inductor current $I_L$ exceeds a reference value determined based on an estimated value of the decrease rate of the absolute value of the current value of the inductor current $I_L$ in the second operation or the third operation. In this manner, the valley current value of the inductor current $I_L$ is controlled to be substantially equal to the target value Is.

According to this embodiment, the current value of the inductor current $I_L$ can be controlled to be within a specific range. As a result, the specifications of components constituting the balance correction circuit 232 can be optimized. Therefore, the cost and the implementation area are reduced. Also, the efficiency of the equalization is improved. Further, it is possible to precisely estimate the time required for the equalization.

Figure 7:
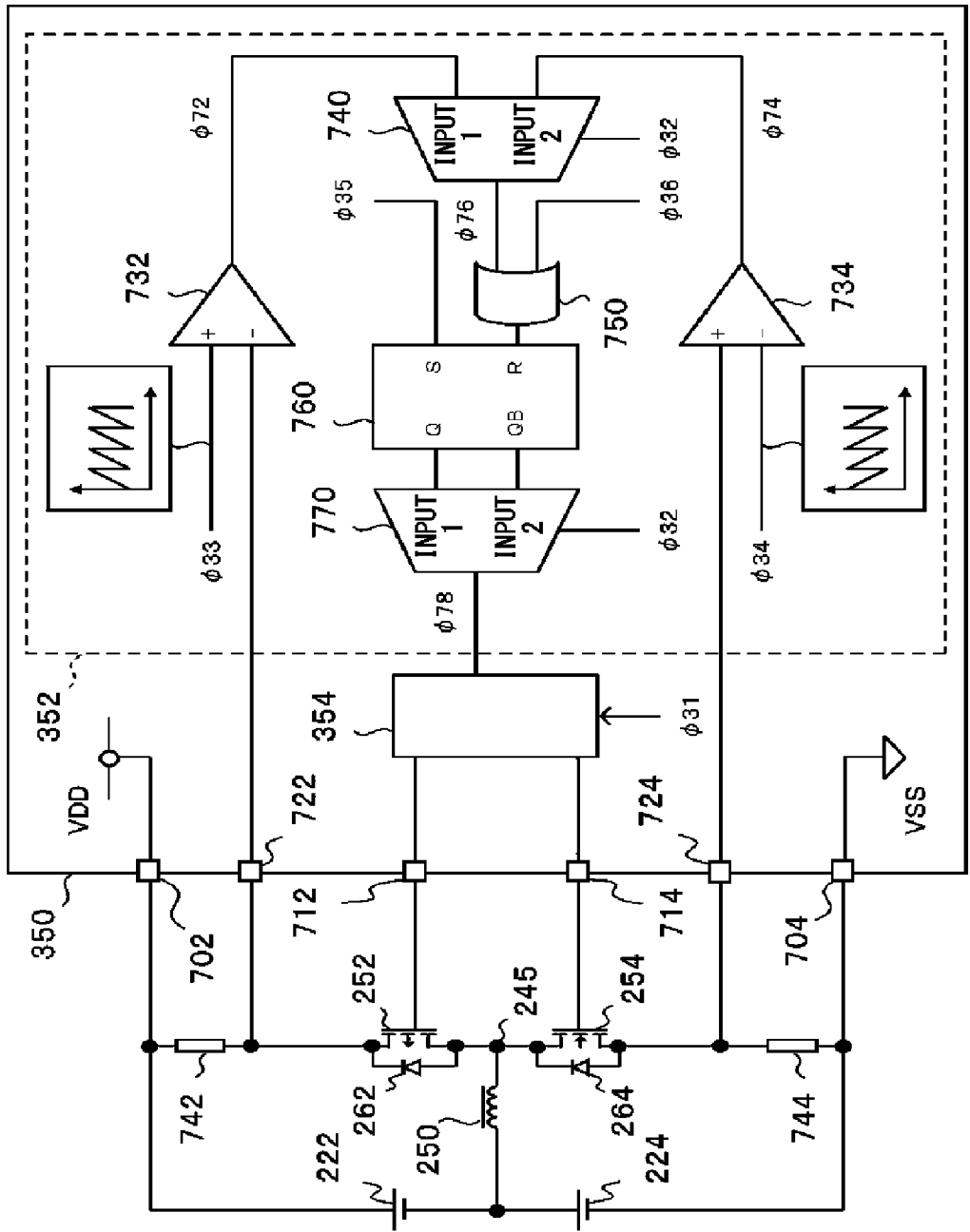
FIG. 7 schematically shows an example of a drive signal supplying unit 350.
Figure 8:
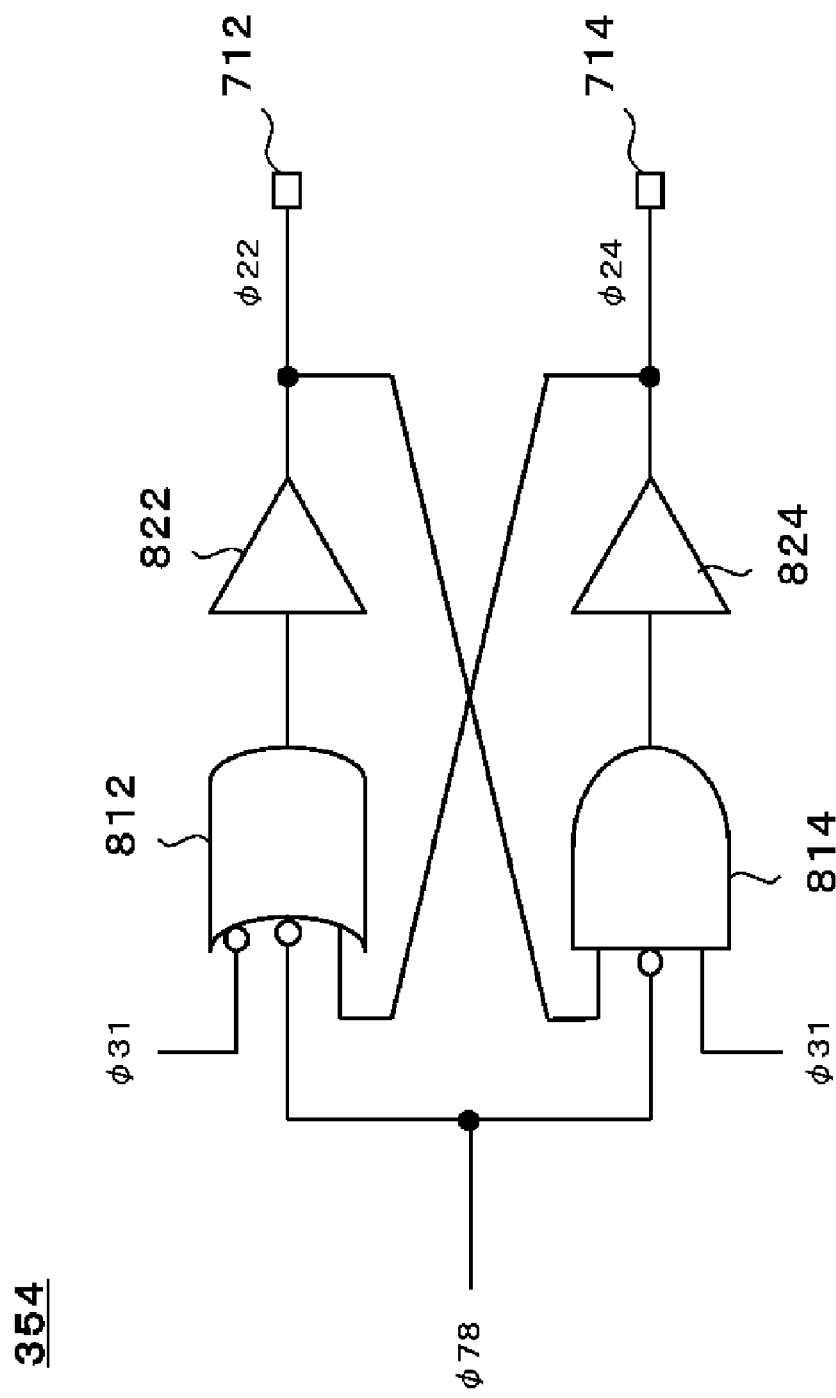
FIG. 8 schematically shows an example of a drive signal generating unit 354.

An example of the circuit configuration of the drive signal supplying unit 350 will be described using FIG. 7 and FIG. 8. FIG. 7 schematically shows an example of the drive signal supplying unit 350. FIG. 8 schematically shows an example of the drive signal generating unit 354.

In this embodiment, the drive signal supplying unit 350 includes a terminal 702, a terminal 704, a terminal 712, a terminal 714, a terminal 722 and a terminal 724. In this embodiment, the drive timing determining unit 352 includes a comparator 732, a comparator 734, a multiplexer 740, an OR circuit 750, a set/reset circuit 760 and a multiplexer 770. In this embodiment, the drive signal generating unit 354 includes an OR circuit 812, an amplifier 822, an AND circuit 814 and an amplifier 824.

The terminal 702 is electrically connected to the terminal of the electric storage cell 222 at its positive pole side. The terminal 702 may be electrically connected to a source voltage VDD. The terminal 704 is electrically connected to the terminal of the electric storage cell 224 at its negative pole side. The terminal 704 may be electrically connected to a ground voltage VSS. The terminal 712 is electrically connected to the gate of the switching element 252. The terminal 712 outputs the drive signal φ22 for controlling the operation of the switching element 252. The terminal 714 is electrically connected to the gate of the switching element 254. The terminal 714 outputs the drive signal φ24 for controlling the operation of the switching element 254.

Information indicating the degree of voltage drop at a current detecting resistance 742 is input to the terminal 722. For example, one end of the current detecting resistance 742 is electrically connected to the terminal 702 and the positive pole side of the electric storage cell 222, and the other end is electrically connected to the terminal 722. Information indicating the degree of voltage drop at a current detecting resistance 744 is input to the terminal 724. For example, one end of the current detecting resistance 744 is electrically connected to the terminal 704 and the negative pole side of the electric storage cell 224, and the other end is electrically connected to the terminal 724. The voltages input to the terminal 722 and the terminal 724 may be an example of the detection voltage for detecting the inductor current. The terminal 722 and the terminal 724 may be an example of the detection voltage acquiring unit 320.

The reference signal φ33 is input to one input of the comparator 732. The detection voltage from the terminal 722 is input to the other input of the comparator 732. If the voltage indicated by the reference signal φ33 is greater than the detection voltage, the comparator 732 outputs H logic as an output signal φ72. If the voltage indicated by the reference signal φ33 is smaller than the detection voltage, the comparator 732 outputs L logic as an output signal φ72. In this manner, it is possible to detect a timing when the voltage indicated by the reference signal φ33 and the detection voltage coincide.

The reference signal φ34 is input to one input of the comparator 734. The detection voltage from the terminal 724 is input to the other input of the comparator 734. If the voltage indicated by the reference signal φ34 is smaller than the detection voltage, the comparator 734 outputs H logic as an output signal φ74. If the voltage indicated by the reference signal φ34 is greater than the detection voltage, the comparator 734 outputs L logic as an output signal φ74. In this manner, it is possible to detect a timing when the voltage indicated by the reference signal φ34 and the detection voltage coincide.

The output signal φ72 from the comparator 732 is input to one input of the multiplexer 740. The output signal φ74 from the comparator 734 is input to the other input of the multiplexer 740. The signal φ32 is input to a selection control input of the multiplexer 740. The multiplexer 740 outputs either one of the output signal φ72 or the output signal φ74 as an output signal φ76 according to the signal φ32.

For example, if the signal φ32 indicates to transfer charges from the electric storage cell 222 to the electric storage cell 224, the multiplexer 740 outputs the output signal φ72 from the comparator 732 as the output signal φ76. On the other hand, if the signal φ32 indicates to transfer charges from the electric storage cell 224 to the electric storage cell 222, the multiplexer 740 outputs the output signal φ74 from the comparator 734 as the output signal φ76.

The output signal φ76 from the multiplexer 740 is input to one input of the OR circuit 750. The reset signal φ36 from the pulse signal generating unit 340 is input to the other input of the OR circuit 750. For example, the pulse signal generating unit 340 (i) generates, when charges are to be transferred from the electric storage cell 222 to the electric storage cell 224, the reset signal φ36 for specifying a maximum value of the duty ratio of the drive signal φ22, and (ii) generates, when charges are to be transferred from the electric storage cell 224 to the electric storage cell 222, the reset signal φ36 for specifying a maximum value of the duty ratio of the drive signal φ24.

The set signal φ35 from the pulse signal generating unit 340 is input to an input S at the set side of the set/reset circuit 760. An output from the OR circuit 750 is input to an input R at the reset side of the set/reset circuit 760. For example, the pulse signal generating unit 340 (i) generates, when charges are to be transferred from the electric storage cell 222 to the electric storage cell 224, the set signal φ35 for specifying a periodic time of generation of the drive signal φ22, and (ii) generates, when charges are to be transferred from the electric storage cell 224 to the electric storage cell 222, the set signal φ35 for specifying a periodic time of generation of the drive signal φ24.

If L logic is input to the input S and L logic is input to the input R, one output Q of the set/reset circuit 760 and the other output QB maintain the present state, for example. If L logic is input to the input S and H logic is input to the input R, one output Q of the set/reset circuit 760 outputs L logic and the other output QB outputs H logic, for example. If H logic is input to the input S and L logic is input to the input R, one output Q of the set/reset circuit 760 outputs H logic and the other output QB outputs L logic, for example. Note that input of H logic to both the input S and the input R may be prohibited or undefined.

One output Q from the set/reset circuit 760 is input to one input of the multiplexer 770. The other output QB from the set/reset circuit 760 is input to the other input of the multiplexer 770. The signal φ32 is input to a selection control input of the multiplexer 740. The multiplexer 770 outputs an output signal φ78 according to the signal φ32.

For example, if the signal φ32 indicates to transfer charges from the electric storage cell 222 to the electric storage cell 224, the multiplexer 770 outputs the signal from one output Q of the set/reset circuit 760 as the output signal φ78. On the other hand, if the signal φ32 indicates to transfer charges from the electric storage cell 224 to the electric storage cell 222, the multiplexer 770 outputs the signal from the other output QB of the set/reset circuit 760 as the output signal φ78.

The drive signal generating unit 354 outputs the drive signal φ22 and the drive signal φ24 according to the output signal φ78. The drive signal generating unit 354 may output the drive signal φ22 and the drive signal φ24 according to the output signal φ78 and the signal φ31. The drive signal generating unit 354 outputs the drive signal φ22 and the drive signal φ24 if the signal φ31 includes information indicating to operate the balance correction circuit 232. In this embodiment, the balance correction circuit 232 is operated if the signal φ31 is H logic, and the balance correction circuit 232 stops if the signal φ31 is L logic.

For example, when charges are to be transferred from the electric storage cell 222 to the electric storage cell 224, the drive signal φ22 for turning on the switching element 252 and the drive signal φ24 for turning off the switching element 254 are supplied at a timing when the set signal φ35 for specifying a periodic time of the switching operation becomes H logic, according to an embodiment. Also, the drive signal φ22 for turning off the switching element 252 and the drive signal φ24 for turning on the switching element 254 are supplied at a timing when the detection voltage from the terminal 722 becomes smaller than the reference voltage, or at a timing when the reset signal φ36 for specifying a maximum value of the duty ratio of the drive signal φ22 becomes H logic.

When charges are to be transferred from the electric storage cell 222 to the electric storage cell 224, the drive signal φ22 for turning on the switching element 252 is supplied at a timing when the set signal φ35 for specifying a periodic time of the switching operation becomes H logic, according to another embodiment. Also, the drive signal φ22 for turning off the switching element 252 is supplied at a timing when the detection voltage from the terminal 722 becomes smaller than the reference voltage, or at a timing when the reset signal φ36 for specifying a maximum value of the duty ratio of the drive signal φ22 becomes H logic. In this case, the switching element 254 stays turned off. Note that, the drive signal φ24 for turning off the switching element 254 may be supplied at a timing when the drive signal φ22 is supplied.

Similarly, when charges are to be transferred from the electric storage cell 224 to the electric storage cell 222, the drive signal φ24 for turning on the switching element 254 and the drive signal φ22 for turning off the switching element 252 are supplied at a timing when the set signal φ35 for specifying a periodic time of the switching operation becomes H logic, according to an embodiment. Also, the drive signal φ24 for turning off the switching element 254 and the drive signal φ22 for turning on the switching element 252 are supplied at a timing when the detection voltage from the terminal 724 becomes greater than the reference voltage, or at a timing when the reset signal φ36 for specifying a maximum value of the duty ratio of the drive signal φ24 becomes H logic.

When charges are to be transferred from the electric storage cell 224 to the electric storage cell 222, the drive signal φ24 for turning on the switching element 254 is supplied at a timing when the set signal φ35 for specifying a periodic time of the switching operation becomes H logic, according to another embodiment. Also, the drive signal φ24 for turning off the switching element 254 is supplied at a timing when the detection voltage from the terminal 724 becomes greater than the reference voltage, or at a timing when the reset signal φ36 for specifying a maximum value of the duty ratio of the drive signal φ24 becomes H logic. In this case, the switching element 252 stays turned off. Note that, the drive signal φ22 for turning off the switching element 252 may be supplied at a timing when the drive signal φ24 is supplied.

Figure 9:
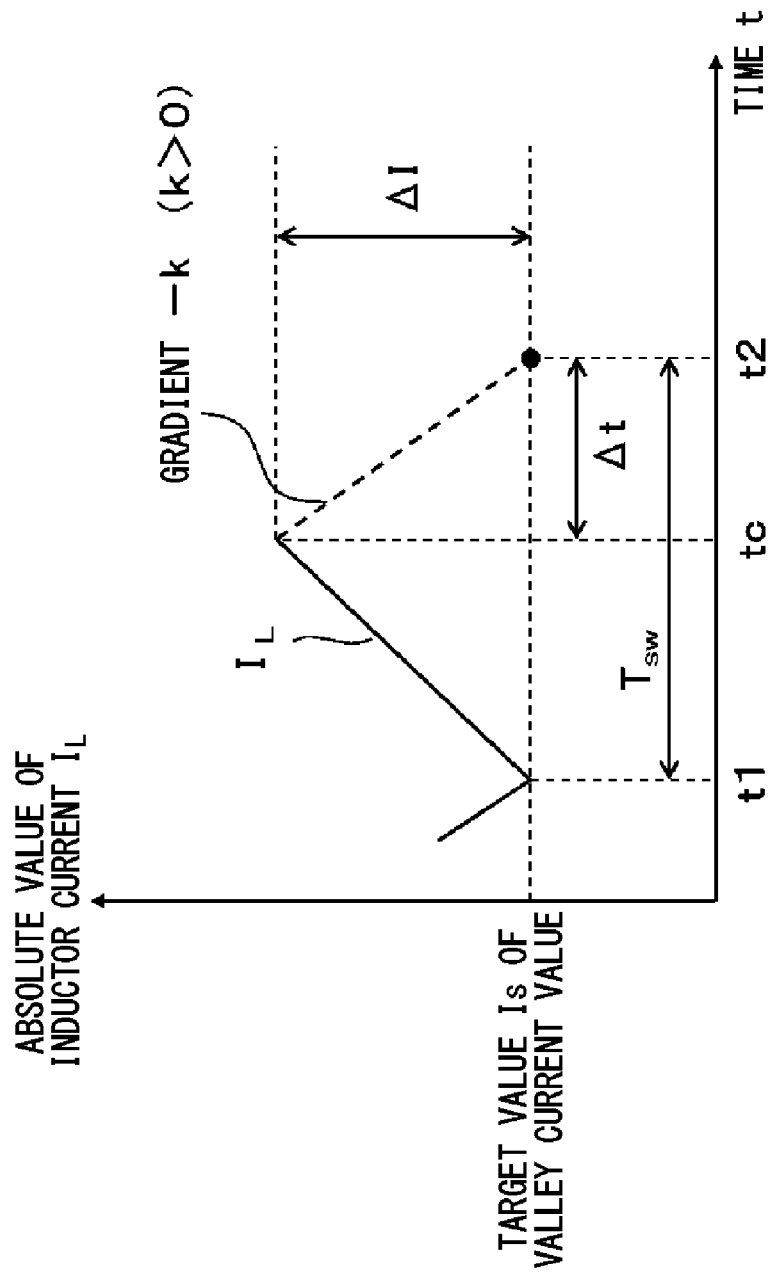
FIG. 9 schematically shows an example of a control method of the valley current value.

FIG. 9 schematically shows an example of a control method of the valley current value. For example, when charges are to be transferred from the electric storage cell 222 to the electric storage cell 224, the switching element 252 is turned on and the switching element 254 is turned off at a time $t_1$, and then the absolute value of the current value of the inductor current $I_L$ monotonically increases as time t elapses. Here, as can be seen, in order to control the valley current value of the inductor current $I_L$ to be the target value Is at a time $t_2$ which is at the beginning of the subsequent periodic time $T_{sw}$ of the switching operation, a time $t_c$ needs to be determined such that the following values are substantially equal: (i) an increment (δI in FIG. 9) by which the current value increases from when the switching element 252 is turned on at the time $t_1$ until when the switching element 252 is turned off at a time $t_c$; and (ii) a decrement by which the current value decreases from when the switching element 252 is turned off at the time $t_c$ until the time $t_2$. In this manner, it is possible to control the balance correction device such that, during at least part of a period of time in which the balance correction device operates, a valley in the absolute value of the current value of the inductor current satisfies a predetermined condition.

Since the periodic time $T_{sw}$ of the switching operation is sufficiently short, the change in the current value of the inductor current $I_L$ can be approximated to be linear. As described above, the decrease rate of the absolute value of the current value of the inductor current $I_L$ can be calculated as V/L using any voltage value V and the inductance L of the inductor 250. Therefore, when charges are to be transferred from the electric storage cell 222 to the electric storage cell 224, for example, it can be seen that the switching element 252 needs to be turned off when the inductor current $I_L$ is Is+V/L×($t_2$−$t_c$).

Note that, in this embodiment, the drive timing determining unit 352 determines a timing to turn off the switching element 252 by comparing a reference voltage into which the estimated value of the change in the current value of the inductor current $I_L$ is converted as voltage and the detection voltage for the inductor current. In this manner, it is possible to control the value of a valley in the absolute value of the current value of the inductor current $I_L$ using a relatively simple circuit.

When $t_c$ is greater than $t_{sw1max}$ after starting to control the valley current value of the inductor current $I_L$, it can be difficult to control the valley current value of the inductor current $I_L$. Also, the decrease rate of the absolute value of the current value of the inductor current $I_L$ changes according to the voltages of the electric storage cell 222 and the electric storage cell 224 at that point of time. Thus, in a preferable embodiment, (i) the degree of error in the decrease rate of the absolute value of the current value of the inductor current $I_L$ is calculated based on at least one of the specifications of the balance correction circuit 232 and the specifications of components constituting the balance correction circuit 232, and (ii) $t_{sw1max}$ is set such that $t_c$ does not exceed $t_{sw1max}$ even in consideration of the calculated degree of error.

In this embodiment, the balance correction circuit 232 controls the valley current value of the inductor current by controlling the length of a period of time during which the current value of the inductor current increases. However, the control method of the valley current value of the inductor current is not limited by this embodiment. According to another embodiment, the balance correction circuit 232 controls the valley current value of the inductor current by controlling the length of a period of time during which the current value of the inductor current decreases. For example, when charges are to be transferred from the electric storage cell 222 to the electric storage cell 224, the balance correction circuit 232 monitors the current value of the inductor current using any means, and repeatedly performs the balance correction operation based on an initial setting until the current value of the inductor current increases to exceed the target value Is. After the current value of the inductor current exceeds the target value Is, the balance correction circuit 232 determines to turn on the switching element 252 at a timing when the inductor current decreases to be equal to the target value Is or smaller than the target value Is. At this time, the balance correction circuit 232 may determine to turn off the switching element 254.

Figure 10:
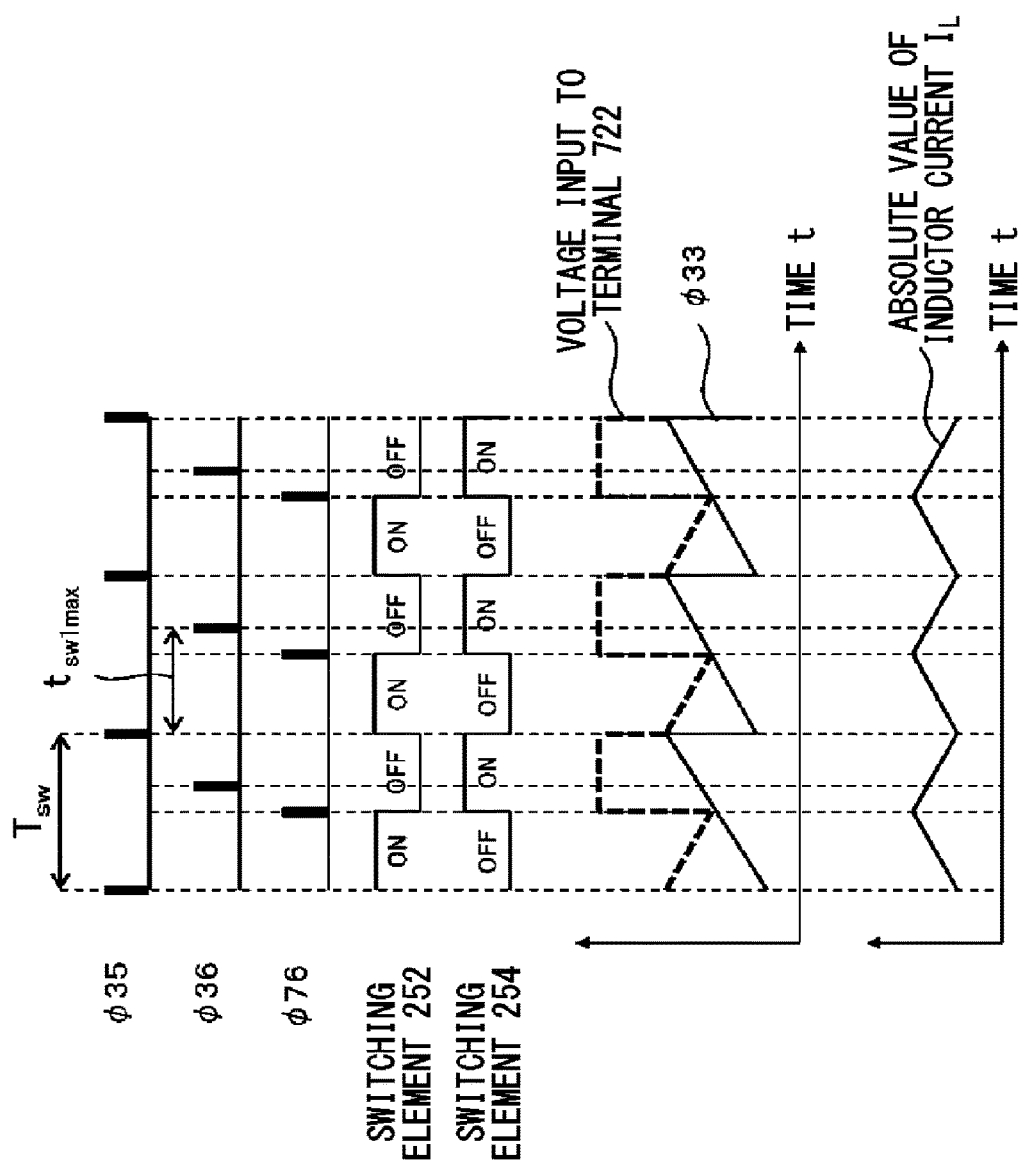
FIG. 10 schematically shows an example of operation of an electric storage module 220.
Figure 11:
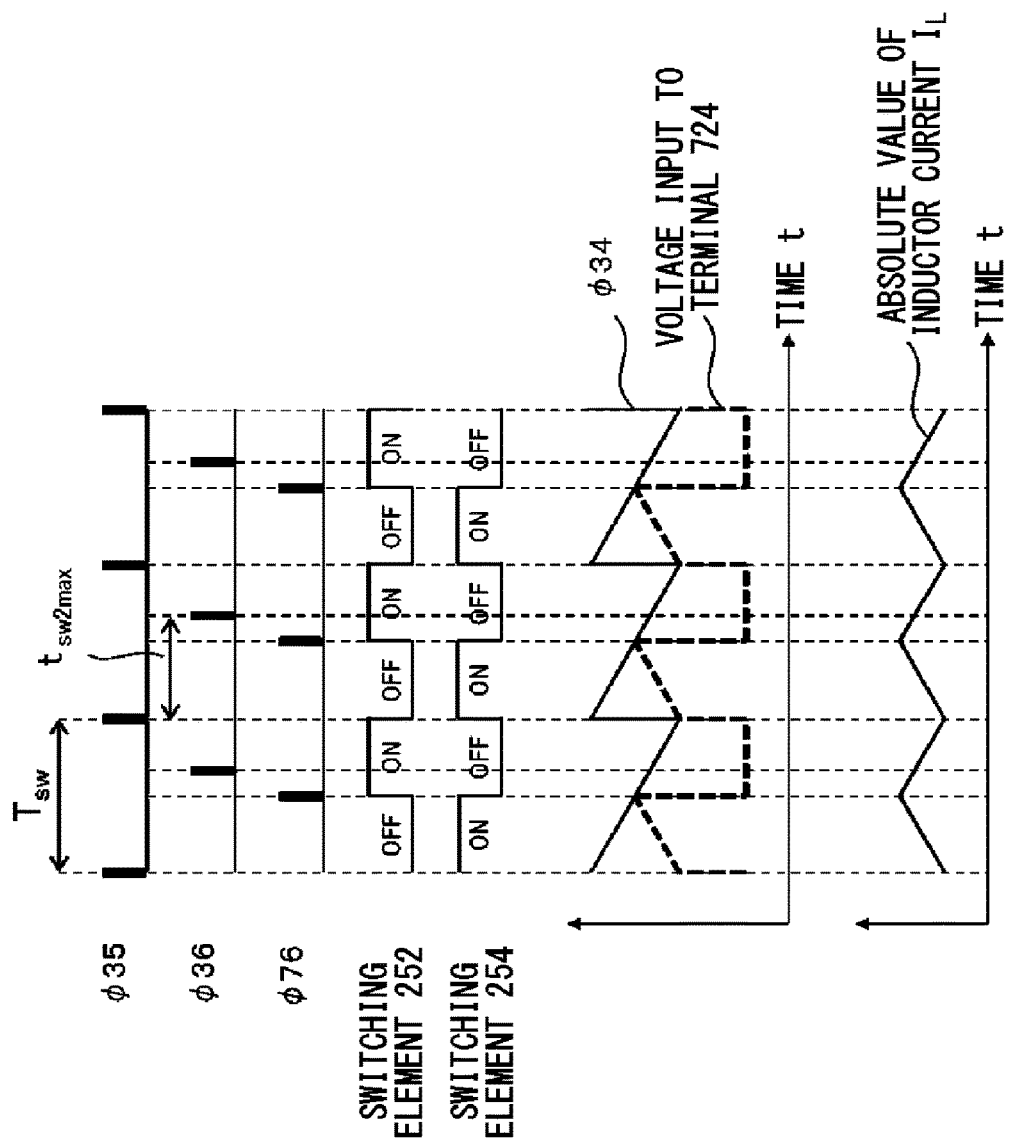
FIG. 11 schematically shows an example of operation of the electric storage module 220.

An example of the operation of the electric storage module 220 will be described using FIG. 10 and FIG. 11. FIG. 10 schematically shows an example of the operation of the electric storage module 220 when charges are to be transferred from the electric storage cell 222 to the electric storage cell 224. FIG. 11 schematically shows an example of the operation of the electric storage module 220 when charges are to be transferred from the electric storage cell 224 to the electric storage cell 222.

As shown in FIG. 10, when the set signal φ35 for specifying a periodic time of the switching operation becomes H logic, the switching element 252 is turned on and the switching element 254 is turned off. When the switching element 252 is turned on, the absolute value of the inductor current $I_L$ monotonically increases over time. The value of the detection voltage for the inductor current $I_L$ is smaller than the voltage of the source voltage VDD by an amount of voltage drop at the current detecting resistance 742, and therefore the detection voltage for the inductor current $I_L$ input to the terminal 722 monotonically decreases as the absolute value of the inductor current $I_L$ monotonically increases.

On the other hand, the voltage waveform of the reference signal φ33 includes a region where its value monotonically increases over time, for example. Also, the gradient of the voltage waveform in the above-described region is determined based on, for example, an estimated value of the decrease rate of the absolute value of the current value of the inductor current $I_L$ when the switching element 252 is turned off and the switching element 254 is turned on. After the switching element 252 is turned on, the detection voltage for the inductor current $I_L$ input to the terminal 722 approaches the voltage indicated by the reference signal φ33 over time. Then, the comparator 732 outputs H logic at a timing when the detection voltage for the inductor current $I_L$ input to the terminal 722 intersects the voltage waveform of the reference signal φ33.

When charges are to be transferred from the electric storage cell 222 to the electric storage cell 224, the logic of the output signal φ76 from the multiplexer 740 is equal to the logic of the output signal φ72 from the comparator 732, and therefore the output signal φ76 is also H logic. In the example in FIG. 10, the output signal φ76 becomes H logic before the reset signal φ36 for specifying a maximum value of the duty ratio of the drive signal φ22 becomes H logic, and therefore the switching element 252 is turned off and the switching element 254 is turned on at a timing when the output signal φ76 becomes H logic.

When the switching element 252 is turned off, the absolute value of the inductor current $I_L$ monotonically decreases over time. As described above, a timing to turn off the switching element 252 is determined such that the following values are substantially equal: (i) an increment by which the absolute value of the current value of the inductor current increases during a period of time from when the switching element 252 is turned on until when the switching element 252 is turned off; and (ii) a decrement by which the absolute value of the current value of the inductor current decreases during a period of time from when the switching element 252 is turned off until when the set signal φ35 subsequently becomes H logic. Therefore, the current value of the inductor current is substantially equal to the target value Is at a timing when the set signal φ35 subsequently becomes H logic.

As shown in FIG. 11, when the set signal φ35 for specifying a periodic time of the switching operation becomes H logic, the switching element 252 is turned off and the switching element 254 is turned on. When the switching element 254 is turned on, the absolute value of the inductor current $I_L$ monotonically increases over time. The value of the detection voltage for the inductor current $I_L$ is greater than the voltage of the ground voltage VSS by an amount of voltage rise at the current detecting resistance 744, and therefore the detection voltage for the inductor current $I_L$ input to the terminal 724 monotonically increases as the absolute value of the inductor current $I_L$ monotonically increases.

On the other hand, the voltage waveform of the reference signal φ34 includes a region where its value monotonically decreases over time, for example. Also, the gradient of the voltage waveform in the above-described region is determined based on, for example, an estimated value of the decrease rate of the absolute value of the current value of the inductor current $I_L$ when the switching element 252 is turned on and the switching element 254 is turned off. After the switching element 254 is turned on, the detection voltage for the inductor current $I_L$ input to the terminal 724 approaches the voltage indicated by the reference signal φ34 over time. Then, the comparator 734 outputs H logic at a timing when the detection voltage for the inductor current $I_L$ input to the terminal 724 intersects the voltage waveform of the reference signal φ34.

When charges are to be transferred from the electric storage cell 224 to the electric storage cell 222, the logic of the output signal φ76 from the multiplexer 740 is equal to the logic of the output signal φ74 from the comparator 734, and therefore the output signal φ76 is also H logic. In the example in FIG. 11, the output signal φ76 becomes H logic before the reset signal φ36 for specifying a maximum value of the duty ratio of the drive signal φ24 becomes H logic, and therefore the switching element 252 is turned on and the switching element 254 is turned off at a timing when the output signal φ76 becomes H logic.

When the switching element 254 is turned off, the absolute value of the inductor current $I_L$ monotonically decreases over time. Then, the current value of the inductor current is substantially equal to the target value Is at a timing when the set signal φ35 subsequently becomes H logic. Note that, in FIG. 11, the symbol $t_{sw2max}$ indicates a maximum value of the ON period of the drive signal φ24.

Figure 12:
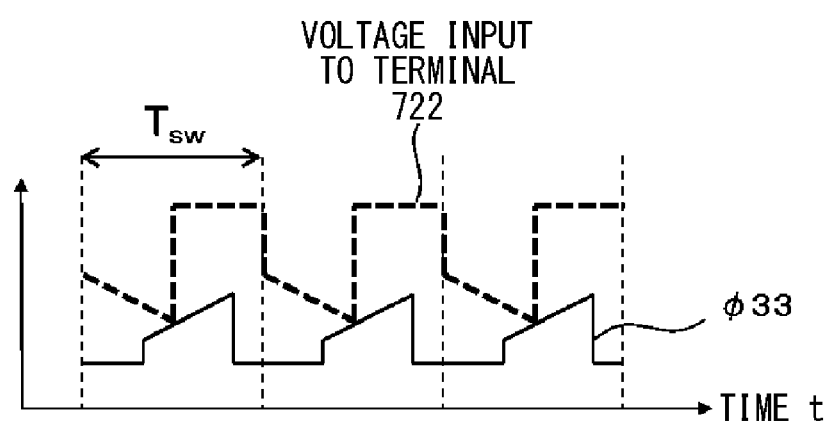
FIG. 12 schematically shows an example of a voltage waveform of a reference signal φ33.

FIG. 12 schematically shows an example of the voltage waveform of the reference signal φ33. The embodiment in FIG. 12 may be an example of the reference signal when charges are to be transferred from the electric storage cell 222 to the electric storage cell 224. In this embodiment, the voltage waveform of the reference signal φ33 has a pulse waveform including a region where its value monotonically increases over time. Also, the gradient of the voltage waveform in the above-described region is determined based on, for example, an estimated value of the decrease rate of the absolute value of the current value of the inductor current $I_L$ when the switching element 252 is turned off and the switching element 254 is turned on. Also, the pulse width is determined to include a timing when the reference signal φ33 and the detection voltage input to the terminal 722 are expected to intersect.

Figure 13:
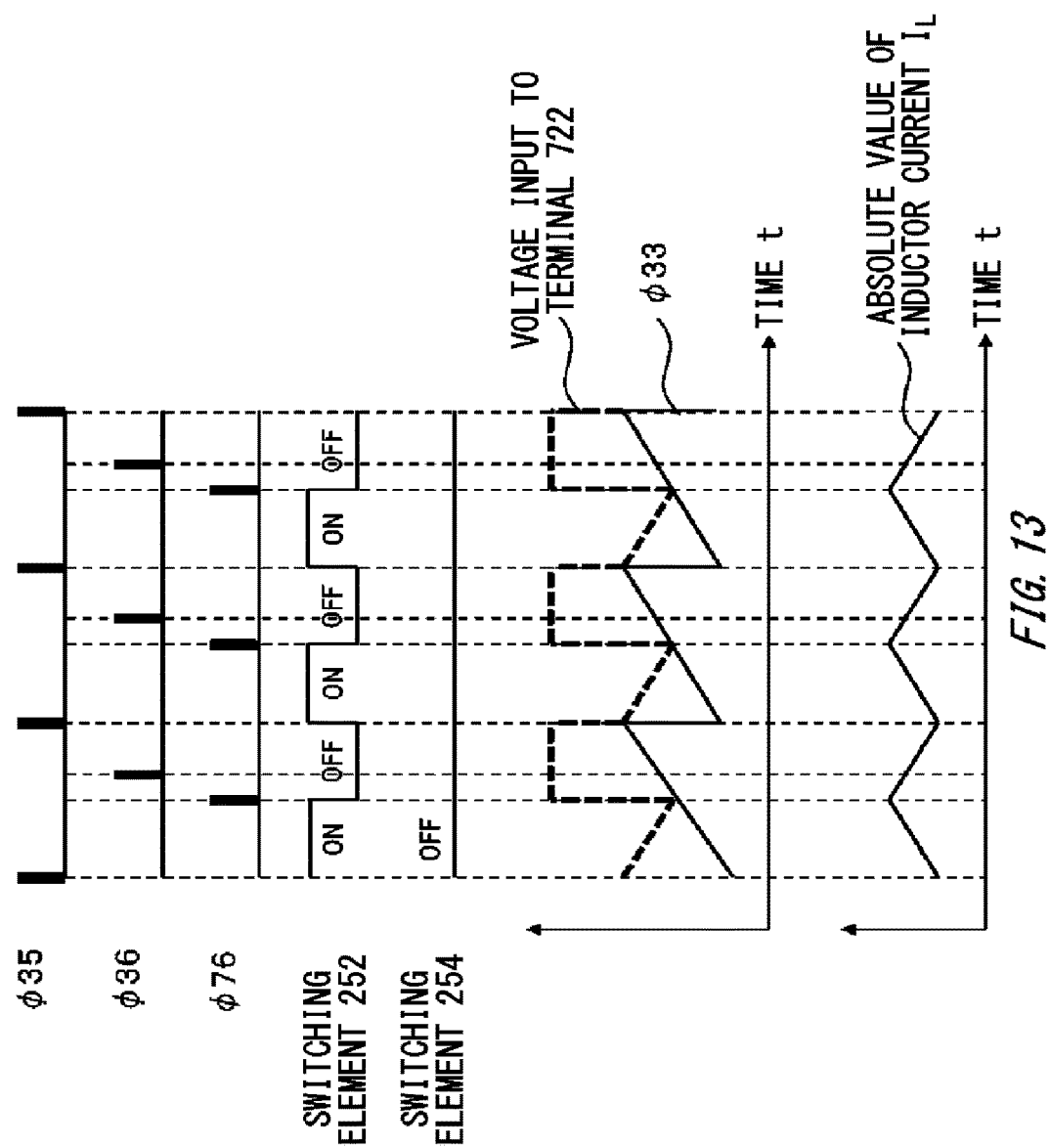
FIG. 13 schematically shows an example of the operation of the electric storage module 220.

FIG. 13 schematically shows an example of the operation of the electric storage module 220. The embodiment in FIG. 13 may be an example of the operation of the electric storage module 220 when charges are to be transferred from the electric storage cell 222 to the electric storage cell 224. The embodiment in FIG. 13 is different from the embodiment in FIG. 10 in that the switching element 254 stays turned off while the balance correction circuit 232 operates. The gradient of the voltage waveform of the reference signal φ33 is also different in association with the above-described difference. Components in the embodiment in FIG. 13 may have similar features to those in the embodiment in FIG. 10 except for those differences. Note that, those skilled in the art who contacted the descriptions of the embodiment in FIG. 13 can appreciate, in view of those descriptions and descriptions in relation to FIG. 11, the operation of the electric storage module 220 when charges are to be transferred from the electric storage cell 224 to the electric storage cell 222.

As shown in FIG. 13, when the set signal φ35 for specifying a periodic time of the switching operation becomes H logic, the switching element 252 is turned on. When the switching element 252 is turned on, the absolute value of the inductor current $I_L$ monotonically increases over time. The value of the detection voltage for the inductor current $I_L$ is smaller than the voltage of the source voltage VDD by an amount of voltage drop at the current detecting resistance 742, and therefore the detection voltage for the inductor current $I_L$ input to the terminal 722 monotonically decreases as the absolute value of the inductor current $I_L$ monotonically increases.

On the other hand, the voltage waveform of the reference signal φ33 includes a region where its value monotonically increases over time, for example. Also, in this embodiment, the gradient of the voltage waveform in the above-described region is determined based on, for example, an estimated value of the decrease rate of the absolute value of the current value of the inductor current $I_L$ when the switching element 252 is turned off and the switching element 254 is turned off. After the switching element 252 is turned on, the detection voltage for the inductor current $I_L$ input to the terminal 722 approaches the voltage indicated by the reference signal φ33 over time. Then, the comparator 732 outputs H logic at a timing when the detection voltage for the inductor current $I_L$ input to the terminal 722 intersects the voltage waveform of the reference signal φ33.

When charges are to be transferred from the electric storage cell 222 to the electric storage cell 224, the logic of the output signal φ76 from the multiplexer 740 is equal to the logic of the output signal φ72 from the comparator 732, and therefore the output signal φ76 is also H logic. In the example in FIG. 13, the output signal φ76 becomes H logic before the reset signal φ36 for specifying a maximum value of the duty ratio of the drive signal φ22 becomes H logic, and therefore the switching element 252 is turned off and the switching element 254 is turned on at a timing when the output signal φ76 becomes H logic.

When the switching element 252 is turned off, the absolute value of the inductor current $I_L$ monotonically decreases over time. As described above, a timing to turn off the switching element 252 is determined such that the following values are substantially equal: (i) an increment by which the absolute value of the current value of the inductor current increases during a period of time from when the switching element 252 is turned on until when the switching element 252 is turned off; and (ii) a decrement by which the absolute value of the current value of the inductor current decreases during a period of time from when the switching element 252 is turned off until when the set signal φ35 subsequently becomes H logic. Therefore, the current value of the inductor current is substantially equal to the target value Is at a timing when the set signal φ35 subsequently becomes H logic.

Figure 14:
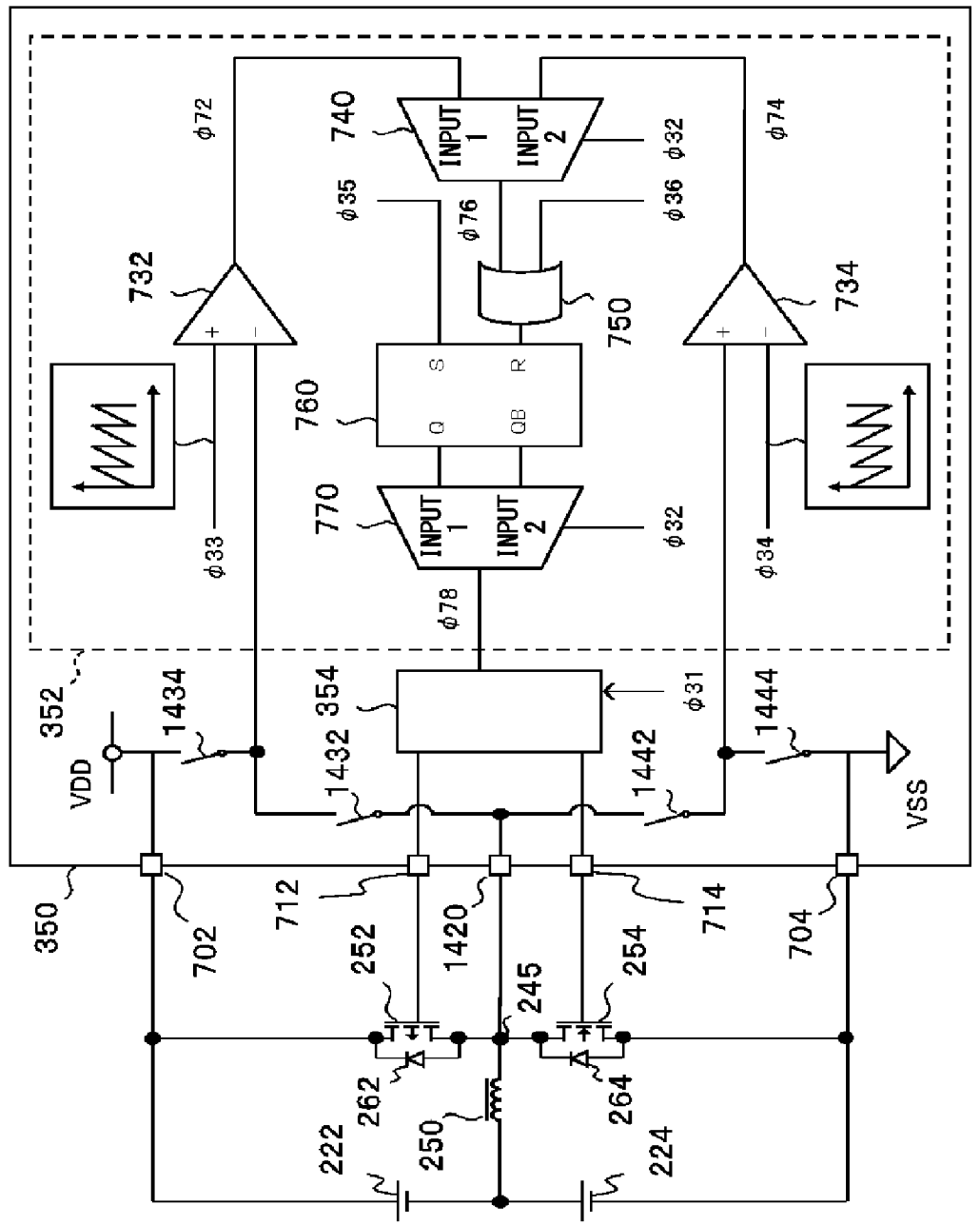
FIG. 14 schematically shows an example of the drive signal supplying unit 350.

FIG. 14 schematically shows an example of the drive signal supplying unit 350. The embodiment in FIG. 14 is different from the embodiment in FIG. 7 in that, as a current detecting resistance for the inductor current, the internal resistance of the switching element 252 is used instead of the current detecting resistance 742, and the internal resistance of the switching element 254 is used instead of the current detecting resistance 744. Components herein may have similar features to those in the embodiment in FIG. 7 except for the above-described differences.

In this embodiment, the drive signal supplying unit 350 includes a terminal 1420 instead of the terminal 722 and the terminal 724. The voltage of the connection point 245 is input to the terminal 1420. The voltage of the connection point 245 may be an example of the information about the current value of the inductor current. The voltage of the connection point 245 may be an example of the detection voltage for detecting the inductor current. The terminal 1420 may be an example of the detection voltage acquiring unit 320.

In this embodiment, the drive signal supplying unit 350 includes a switching element 1432 arranged between the terminal 1420 and the comparator 732. One end of the switching element 1432 is electrically connected to the terminal 1420 and the other end of the switching element 1432 is electrically connected to the comparator 732. The drive signal supplying unit 350 includes a switching element 1434 arranged between the source voltage VDD and the comparator 732. One end of the switching element 1434 is electrically connected to the source voltage VDD. The other end of the switching element 1434 is electrically connected to the other end of the switching element 1432.

For example, the switching element 1432 is controlled to be turned on when the switching element 252 is turned on and to be turned off when the switching element 252 is turned off. For example, the switching element 1434 is controlled to be turned on when the switching element 252 is turned off and to be turned off when the switching element 252 is turned on. In this manner, inputs to the comparator 732 can be adjusted.

In this embodiment, the drive signal supplying unit 350 includes a switching element 1442 arranged between the terminal 1420 and the comparator 734. One end of the switching element 1442 is electrically connected to the terminal 1420 and the other end of the switching element 1442 is electrically connected to the comparator 734. The drive signal supplying unit 350 includes a switching element 1444 arranged between the ground voltage VSS and the comparator 734. One end of the switching element 1444 is electrically connected to the ground voltage VSS. The other end of the switching element 1444 is electrically connected to the other end of the switching element 1442.

For example, the switching element 1442 is controlled to be turned on when the switching element 254 is turned on and to be turned off when the switching element 254 is turned off. For example, the switching element 1444 is controlled to be turned on when the switching element 254 is turned off and to be turned off when the switching element 254 is turned on. In this manner, inputs to the comparator 734 can be adjusted.

While the embodiments of the present invention have been described, the technical scope of the invention is not limited to the above described embodiments. It is apparent to persons skilled in the art that various alterations and improvements can be added to the above-described embodiments. Also, unless a technical contradiction occurs, the matters described in the particular embodiment can be applied to another embodiment. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

The present specification discloses the following articles.

[Article A]

A control device for controlling a balance correction device which equalizes voltages of a first electric storage cell and a second electric storage cell connected in series, wherein the balance correction device includes:

an inductor having one end electrically connected to a connection point between one end of the first electric storage cell and one end of the second electric storage cell;

a first switching element electrically connected between another end of the inductor and another end of the first electric storage cell; and at least one of (i) a second switching element and (ii) a second rectifier, electrically connected between the other end of the inductor and the other end of the second electric storage cell, wherein the second rectifier passes current flowing in a direction from a negative pole side of the second electric storage cell toward a positive pole side of the second electric storage cell and does not pass current flowing in a direction from the positive pole side of the second electric storage cell toward the negative pole side of the second electric storage cell, and the control device includes:

a current information acquiring unit which acquires information about a current value of current flowing in the inductor; and a control signal supplying unit which supplies the balance correction device with a control signal for controlling the balance correction device, such that a valley in an absolute value of the current value satisfies a predetermined condition, based on information about the current value acquired by the current information acquiring unit, during at least part of a period of time in which the balance correction device operates.

[Article B]

A control device for controlling a balance correction device which equalizes voltages of a first electric storage cell and a second electric storage cell connected in series, wherein the balance correction device includes:

an inductor having one end electrically connected to a connection point between one end of the first electric storage cell and one end of the second electric storage cell;

at least one of (i) a first switching element and (ii) a first rectifying unit, electrically connected between another end of the inductor and another end of the first electric storage cell; and a second switching element electrically connected between the other end of the inductor and the other end of the second electric storage cell, wherein the first rectifying unit passes current flowing in a direction from a negative pole side of the first electric storage cell toward a positive pole side of the first electric storage cell and does not pass current flowing in a direction from the positive pole side of the first electric storage cell toward the negative pole side of the first electric storage cell, and the control device includes:

a current information acquiring unit which acquires information about a current value of current flowing in the inductor; and a control signal supplying unit which supplies the balance correction device with a control signal for controlling the balance correction device, such that a valley in an absolute value of the current value satisfies a predetermined condition, based on information about the current value acquired by the current information acquiring unit, during at least part of a period of time in which the balance correction device operates.

[Article C]

A control device for controlling a balance correction device which equalizes voltages of a first electric storage cell and a second electric storage cell connected in series, wherein the balance correction device includes:

an inductor having one end electrically connected to a connection point between one end of the first electric storage cell and one end of the second electric storage cell;

at least one of (i) a first switching element and (ii) a first rectifying unit, electrically connected between another end of the inductor and another end of the first electric storage cell; and at least one of (i) a second switching element and (ii) a second rectifier, electrically connected between the other end of the inductor and the other end of the second electric storage cell, wherein the balance correction device includes at least one of the first switching element and the second switching element, the first rectifying unit passes current flowing in a direction from a negative pole side of the first electric storage cell toward a positive pole side of the first electric storage cell and does not pass current flowing in a direction from the positive pole side of the first electric storage cell toward the negative pole side of the first electric storage cell, the second rectifier passes current flowing in a direction from a negative pole side of the second electric storage cell toward a positive pole side of the second electric storage cell and does not pass current flowing in a direction from the positive pole side of the second electric storage cell toward the negative pole side of the second electric storage cell, and
the control device includes:
a current information acquiring unit which acquires information about a current value of current flowing in the inductor; and
a control signal supplying unit which supplies the balance correction device with a control signal for controlling the balance correction device, such that a valley in an absolute value of the current value satisfies a predetermined condition, based on information about the current value acquired by the current information acquiring unit, during at least part of a period of time in which the balance correction device operates.

EXPLANATION OF REFERENCES

100: apparatus, 102: motor, 110: electric storage system, 112: terminal, 114: terminal, 116: protection circuit, 120: electric storage module, 122: electric storage cell, 124: electric storage cell, 126: electric storage cell, 128: electric storage cell, 132: balance correction circuit, 134: balance correction circuit, 136: balance correction circuit, 143: connection point, 145: connection point, 147: connection point, 210: electric storage system, 212: terminal, 214: terminal, 216: protection circuit, 220: electric storage module, 222: electric storage cell, 224: electric storage cell, 232: balance correction circuit, 243: connection point, 245: connection point, 250: inductor, 252: switching element, 254: switching element, 262: diode, 264: diode, 270: equalization control unit, 280: voltage monitoring unit, 282: voltage detecting unit, 284: voltage detecting unit, 286: difference detecting unit, 290: module control unit, 310: receiving unit, 320: detection voltage acquiring unit, 330: reference signal generating unit, 340: pulse signal generating unit, 350: drive signal supplying unit, 352: drive timing determining unit, 354: drive signal generating unit, 410: voltage information acquiring unit, 420: operation control signal generating unit, 430: charge transfer amount integrating unit, 440: input/output unit, 702: terminal, 704: terminal, 712: terminal, 714: terminal, 722: terminal, 724: terminal, 732: comparator, 734: comparator, 740: multiplexer, 742: current detecting resistance, 744: current detecting resistance, 750: OR circuit, 760: set/reset circuit, 770: multiplexer, 812: OR circuit, 814: AND circuit, 822: amplifier, 824: amplifier, 1420: terminal, 1432: switching element, 1434: switching element, 1442: switching element, 1444: switching element

What is claimed is:

1. A control device for controlling a balance correction device which equalizes voltages of a first electric storage cell and a second electric storage cell connected in series, wherein
the balance correction device comprises:
an inductor having one end electrically connected to a connection point between one end of the first electric storage cell and one end of the second electric storage cell;
a first switching element electrically connected between another end of the inductor and another end of the first electric storage cell; and
at least one of (i) a second switching element and (ii) a rectifier, electrically connected between the other end of the inductor and the other end of the second electric storage cell, wherein
the rectifier passes current flowing in a direction from a negative pole side of the second electric storage cell toward a positive pole side of the second electric storage cell and does not pass current flowing in a direction from the positive pole side of the second electric storage cell toward the negative pole side of the second electric storage cell, and
the control device comprises:
a current information acquiring unit which acquires information about a current value of current flowing in the inductor; and
a control signal supplying unit which supplies the balance correction device with a control signal for controlling the balance correction device, such that a valley in an absolute value of the current value satisfies a predetermined condition, based on information about the current value acquired by the current information acquiring unit, during at least part of a period of time in which the balance correction device operates;
wherein the control signal supplying unit supplies the control signal such that (i) a value of the valley is equal to a predetermined first value, (ii) a value of the valley is greater than the first value, or (iii) a value of the valley is within a predetermined range including the first value;
(a) if the balance correction device comprises at least the second switching element, the control signal supplying unit supplies the first switching element and the second switching element with the control signal for controlling the first switching element and the second switching element to be turned on and off such that, while the balance correction device operates, the balance correction device repeatedly performs a switching operation including (i) a first operation in which the first switching element is turned on and the second switching element is turned off and (ii) a second operation in which the first switching element is turned off and the second switching element is turned on;
(b) if the balance correction device comprises the second switching element and the rectifier arranged in parallel, the control signal supplying unit supplies the first switching element and the second switching element with the control signal for controlling the first switching element and the second switching element to be turned on and off such that, while the balance correction device operates, the balance correction device repeatedly performs a switching operation including (i) a first operation in which the first switching element is turned on and the second switching element is turned off, and at least one of (ii) a second operation in which the first switching element is turned off and the second switching element is turned on and (iii) a third operation in which the first switching element is turned off and the second switching element is turned off; or
(c) if the balance correction device comprises at least the rectifier, the control signal supplying unit supplies the first switching element with the control signal for controlling the first switching element to be turned on and off such that, while the balance correction device operates, the balance correction device repeatedly performs a switching operation including (i) a first operation in which the first switching element is turned on and (ii) a second operation in which the first switching element is turned off.

2. The control device according to claim 1, wherein the control signal supplying unit comprises:
a first timing determining unit which determines a timing to supply a first control signal for turning on the first switching element;

a second timing determining unit which determines a timing to supply a second control signal for turning off the first switching element; and a control signal generating unit which generates the first control signal at the timing determined by the first timing determining unit and generates the second control signal at the timing determined by the second timing determining unit, wherein:

(a) if the balance correction device comprises at least the second switching element, the first control signal is a signal for turning on the first switching element and turning off the second switching element, and the second control signal is a signal for turning off the first switching element and turning on the second switching element;

(b) if the balance correction device comprises the second switching element and the rectifier arranged in parallel, the first control signal is a signal for turning on the first switching element and turning off the second switching element, and the second control signal is (i) a signal for turning off the first switching element and turning on the second switching element or (ii) a signal for turning off the first switching element and turning off the second switching element; or (c) if the balance correction device comprises at least the rectifier, the first control signal is a signal for turning on the first switching element, and the second control signal is a signal for turning off the first switching element.

3. The control device according to claim 2, wherein:
when charges are to be transferred from the first electric storage cell to the second electric storage cell, the first timing determining unit determines to supply the first control signal at a predetermined periodic time; and when charges are to be transferred from the first electric storage cell to the second electric storage cell, the second timing determining unit determines to supply the second control signal at a timing when the absolute value of the current value exceeds a reference value determined based on (i) the first value and (ii) an estimated value of a decrease rate of the absolute value of the current value in the second operation.

4. The control device according to claim 3, wherein:
the second timing determining unit determines, when a first reference voltage having a predetermined first voltage waveform and a detection voltage for detecting the current coincide, to supply the second control signal; and the reference voltage includes a triangular wave, sawtooth wave or trapezoidal wave having a gradient according to the estimated value of the decrease rate of the absolute value of the current value.

5. The control device according to claim 3, wherein the second timing determining unit determines, when the absolute value of the current value does not exceed the reference value within a predetermined first period, to supply the second control signal at a timing when the first period has elapsed.

6. The control device according to claim 2, wherein:
the balance correction device comprises the second switching element;

when charges are to be transferred from the second electric storage cell to the first electric storage cell, the first timing determining unit determines to supply the first control signal at a timing when the absolute value of the current value exceeds a reference value determined based on (i) the first value and (ii) an estimated value of a decrease rate of the absolute value of the current value in the first operation; and when charges are to be transferred from the second electric storage cell to the first electric storage cell, the second timing determining unit determines to supply the second control signal at a predetermined periodic time.

7. The control device according to claim 6, wherein:
the first timing determining unit determines, when a second reference voltage having a predetermined second voltage waveform and a detection voltage for detecting the current coincide, to supply the first control signal; and the reference voltage includes a triangular wave, sawtooth wave or trapezoidal wave having a gradient according to the estimated value of the decrease rate of the detection voltage.

8. The control device according to claim 6, wherein the first timing determining unit determines, when the absolute value of the current value does not exceed the reference value within a predetermined second period, to supply the first control signal at a timing when the second period has elapsed.

9. The control device according to claim 1, wherein the control signal supplying unit supplies the control signal such that (i) a value of the valley is equal to a first value determined based on a value of a voltage or SOC of at least one of the first electric storage cell and the second electric storage cell, (ii) a value of the valley is greater than the first value, or (iii) a value of the valley is within a range including the first value, the range determined based on a value of a voltage or SOC of at least one of the first electric storage cell and the second electric storage cell.

10. The control device according to claim 1, further comprising a current detecting unit which detects the current.

11. The control device according to claim 1, further comprising a direction determining unit which determines a direction to transfer charges.

12. The control device according to claim 1, further comprising an operation determining unit which determines at least one of whether or not to operate the balance correction device and whether or not to stop the balance correction device.

13. The control device according to claim 1, further comprising a charge transfer amount estimating unit which estimates an amount of charges transferred between the first electric storage cell and the second electric storage cell based on (i) an operating time of the balance correction device, and (ii) at least one of information about the current value acquired by the current information acquiring unit and the predetermined condition about a valley in the absolute value of the current value.

14. The control device according to claim 1, wherein at least one of the first electric storage cell and the second electric storage cell comprises a lithium-ion battery including a lithium compound containing an iron component as a positive electrode material.

15. A balance correction device which equalizes voltages of a first electric storage cell and a second electric storage cell connected in series, comprising:
an inductor having one end electrically connected to a connection point between one end of the first electric storage cell and one end of the second electric storage cell;

a first switching element electrically connected between another end of the inductor and another end of the first electric storage cell;

at least one of (i) a second switching element and (ii) a rectifier, electrically connected between the other end of the inductor and the other end of the second electric storage cell; and the control device according to claim 1, wherein the rectifier passes current flowing in a direction from a negative pole side of the second electric storage cell toward a positive pole side of the second electric storage cell and does not pass current flowing in a direction from the positive pole side of the second electric storage cell toward the negative pole side of the second electric storage cell.

16. An electric storage system comprising:

a first electric storage cell and a second electric storage cell connected in series; and the balance correction device according to claim 15.

17. An apparatus comprising:

the electric storage system according to claim 16; and at least one of (i) a load which consumes electric power supplied from the electric storage system and (ii) charging equipment for supplying electric power from the electric storage system to other equipment.

* * * * *